US011128393B2

(12) United States Patent
Lin et al.

(10) Patent No.: US 11,128,393 B2
(45) Date of Patent: Sep. 21, 2021

(54) ELECTRONIC DEVICE AND METHOD FOR INTERLEAVE DIVISION MULTIPLE ACCESS COMMUNICATION

(71) Applicant: SONY CORPORATION, Tokyo (JP)

(72) Inventors: Zhiyuan Lin, Beijing (CN); Jin Sima, Beijing (CN); Bo Bai, Beijing (CN); Wei Chen, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/309,811

(22) PCT Filed: Jun. 14, 2017

(86) PCT No.: PCT/CN2017/088221
§ 371 (c)(1),
(2) Date: Dec. 13, 2018

(87) PCT Pub. No.: WO2017/215605
PCT Pub. Date: Dec. 21, 2017

(65) Prior Publication Data
US 2019/0132072 A1 May 2, 2019

(30) Foreign Application Priority Data

Jun. 14, 2016 (CN) .......................... 201610416803.4

(51) Int. Cl.
H04J 13/00 (2011.01)
H04L 1/00 (2006.01)
H04L 5/00 (2006.01)

(52) U.S. Cl.
CPC ...... H04J 13/0048 (2013.01); H04J 13/0003 (2013.01); H04L 1/0071 (2013.01); H04L 5/0037 (2013.01); H04J 2211/008 (2013.01)

(58) Field of Classification Search
None
See application file for complete search history.

(56) References Cited

U.S. PATENT DOCUMENTS

2006/0039271 A1* 2/2006 Li ....................... H04W 52/262
370/208
2009/0060094 A1* 3/2009 Jung ..................... H04L 1/0003
375/340

(Continued)

FOREIGN PATENT DOCUMENTS

CN 101047393 A 10/2007
CN 101227195 A 7/2008

(Continued)

Primary Examiner — Gregory B Sefcheck
Assistant Examiner — Suk Jin Kang
(74) Attorney, Agent, or Firm — Xsensus, LLP

(57) ABSTRACT

The present disclosure provides electronic device and method for interleaved multiple access communication. An electronic device for an interleaved multiple access control terminal comprises a processing circuit, which is configured to acquire information about interleaved multiple access communication between a receiving apparatus and a transmitting apparatus; determine configuration parameters for the transmitting apparatus based on the information, the configuration parameters comprising operation parameters of an interleaver of the transmitting apparatus, the interleaver being used to distinguish the transmitting apparatus from other transmitting apparatus; and provide the determined configuration parameters to the transmitting apparatus, so that the transmitting apparatus is configured with the transmitting parameters for communicating with the receiving apparatus.

20 Claims, 17 Drawing Sheets

(56) References Cited

U.S. PATENT DOCUMENTS

| | | | |
|---|---|---|---|
| 2009/0132872 A1* | 5/2009 | Leung | H03M 13/6505 714/701 |
| 2010/0220768 A1* | 9/2010 | Zeng | H03M 13/6325 375/141 |
| 2013/0265901 A1* | 10/2013 | Pedersen | H04W 16/14 370/252 |
| 2014/0078922 A1* | 3/2014 | Xing | H04J 11/005 370/252 |
| 2014/0119352 A1* | 5/2014 | Matsumoto | H04J 15/00 370/337 |
| 2015/0237651 A1* | 8/2015 | Nobusawa | H04W 72/121 370/329 |
| 2015/0381318 A1* | 12/2015 | Zhang | H04L 1/0071 370/335 |
| 2016/0014760 A1* | 1/2016 | Lyu | H04B 7/2615 370/329 |
| 2016/0073368 A1* | 3/2016 | Lyu | H04L 1/0071 370/330 |
| 2016/0127085 A1* | 5/2016 | Kim | H04L 5/0001 370/329 |
| 2016/0198446 A1* | 7/2016 | Wild | H04L 5/0037 370/330 |
| 2016/0269214 A1* | 9/2016 | Popovic | H03M 13/2739 |
| 2017/0164369 A1* | 6/2017 | Lin | H04W 72/0466 |
| 2017/0230138 A1* | 8/2017 | Xiong | H04L 1/0003 |
| 2017/0264393 A1* | 9/2017 | Park | H04L 1/0054 |
| 2018/0027499 A1* | 1/2018 | Dang | H04L 27/2626 455/522 |
| 2018/0041988 A1* | 2/2018 | Lee | H04W 72/0446 |
| 2018/0084535 A1* | 3/2018 | Lyu | H04B 7/2615 |
| 2018/0152257 A1* | 5/2018 | Seo | H04L 1/00 |
| 2019/0052309 A1* | 2/2019 | Schmidt | H04L 5/0048 |
| 2019/0103942 A1* | 4/2019 | Wu | H03M 13/271 |
| 2019/0116004 A1* | 4/2019 | Goto | H04L 5/0048 |
| 2019/0150191 A1* | 5/2019 | Lee | H04W 74/08 370/329 |
| 2019/0222371 A1* | 7/2019 | Sahin | H04L 1/0068 |
| 2019/0363834 A1* | 11/2019 | Cao | H04L 1/1845 |

FOREIGN PATENT DOCUMENTS

| | | |
|---|---|---|
| CN | 101616115 A | 12/2009 |
| CN | 104426630 B | 3/2015 |

\* cited by examiner

| Serial Number | Walsh Sequence |
|---|---|
| 000 | null |
| 001 | +1, +1, +1, +1, -1, -1, -1, -1 |
| 010 | +1, +1, -1, -1, +1, +1, -1, -1 |
| ... | ... |
| 111 | +1, -1, -1, +1, -1, +1, +1, -1 |

|  | Transmitter type 1 | | Transmitter type 2 | |
| --- | --- | --- | --- | --- |
|  | H=1 | H=2.236 | H=1 | H=2.236 |
| Number of Interleavers | 10 | 10 | 20 | 20 |
| Number of Quadrature Interleavers in IDMA 1 | 0 | 0 | 0 | 0 |
| Number of Quadrature Interleavers in IDMA 2 | 6 | 5 | 10 | 10 |
| Number of Quadrature Interleavers in IDMA 3 | 1 | 10 | 0 | 20 |

| Eb/N0(dB) | Iterations in IDMA1 | Iterations in IDMA 2 | Iterations in IDMA 3 |
|---|---|---|---|
| 10 | 7 | 7 | 4 |
| 9 | 8 | 7 | 4 |
| 8 | 8 | 7 | 4 |

ELECTRONIC DEVICE AND METHOD FOR INTERLEAVE DIVISION MULTIPLE ACCESS COMMUNICATION

CROSS-REFERENCE TO RELATED APPLICATIONS

This application is a national stage (under 35 U.S.C. 371) of International Patent Application No. PCT/CN2017/088221, filed Jun. 14, 2017 and claims the benefit of Chinese Patent Application No. 201610416803.4, filed on Jun. 14, 2016, the contents of all of which being hereby incorporated by reference as if fully set-forth herein in their respective entirety, for all purposes.

FIELD OF THE INVENTION

The present disclosure generally relates to wireless multiple access communication and, more particularly, to an electronic device and a method for interleaved multiple access communication.

BACKGROUND

In recent years, in the field of wireless multiple access communication, in order to make better use of time-frequency resources and improve performance of a communication system, various multiple access methods have been proposed, such as frequency division multiple access (FDMA), Time Division Multiple Access (TDMA), Code Division Multiple Access (CDMA), and the like. However, with continuously increasement of communication requirements, the traditional multiple access methods have been unable to meet the user requirement. For example, in the future 5G era, MTC (Machine Type Communication) will be a very important application environment, but its characteristic of having large number of user to access will make the traditional multiple access systems overwhelmed. Therefore, how to ensure the access of a large number of users will be a problem which need to be focused on by the next type of multiple access method.

An Interleave Division Multiple Access (IDMA) technique provides a new method to solve this problem by virtue of its own characteristics including support for a large number of users, low complexity of the receiving end and the like. At the transmitting end, the IDMA system uses different interleavers to distinguish between different data streams. At the receiving end, the IDMA system adopts a simple and effective turbo iterative method, which is referred to as chip by chip multi-user detection, so that the complexity of the receiving end is greatly reduced while the system performance is improved.

The IDMA system is different from any traditional CDMA system, and its core is to use different interleavers to distinguish between different users. Improving the way of generating interleavers is an important way to improve performance of the IDMA system. In traditional IDMA systems, different interleavers typically are non-quadrature thereamong and typically are random interleavers. For example, in Altamimi, Ahmed B. and T. Aaron Gulliver, "On Interleaver Design for Interleave Division Multiple Access (IDMA)", Wireless Communications Networking and Mobile Computing (WiCOM), 2010 6th International Conference on. IEEE, 2010, Ahmed et al. proposed a tree based method of generating random interleavers. In Gupta, Ruchir et al., "Prime number based interleaver for multiuser iterative IDMA systems", Computational Intelligence and Communication Networks (CICN), 2010 International Conference on. IEEE, 2010, Ruchir et al. proposed a prime based method of generating random interleavers. In addition, in Pupeza, Ioachim, and Li Ping, "Efficient generation of interleavers for IDMA", Communications, 2006, ICC'06, IEEE International Conference on. Vol. 4. IEEE, 2006, Pupeza et al. have attempted to convert non-quadrature interleavers into quadrature interleavers. In addition, in Linton, Lance, et al., "Multi-rate communications using layered interleave-division multiple access with power allocation", Wireless Communications and Networking Conference, 2009. WCNC 2009. IEEE. IEEE, 2009: 1-5, Lance, et al. proposed a layered IDMA structure.

DISCLOSURE OF THE INVENTION

The present invention proposes an improved technique for interleaved multiple access communication.

In one aspect of the present disclosure, there provides an electronic device for an interleaved multiple access control terminal, comprising: a processing circuit, configured to acquire information about interleaved multiple access communication between a receiving apparatus and a transmitting apparatus; determine configuration parameters for the transmitting apparatus based on the information, the configuration parameters comprising operation parameters of an interleaver of the transmitting apparatus, the interleaver being used to distinguish the transmitting apparatus from other transmitting apparatus; and provide the determined configuration parameters to the transmitting apparatus, so that the transmitting apparatus is configured with the configuration parameters for communicating with the receiving apparatus.

In one aspect of the present disclosure, there provides a method method for interleaved multiple access communication, comprising: acquiring information about interleaved multiple access communication between a receiving apparatus and a transmitting apparatus; determining configuration parameters for the transmitting apparatus based on the information, the configuration parameters comprising operation parameters of an interleaver of the transmitting apparatus, the interleaver being used to distinguish the transmitting apparatus from other transmitting apparatus; and providing the determined configuration parameters to the transmitting apparatus, so that the transmitting apparatus is configured with the configuration parameters for communicating with the receiving apparatus.

In one aspect of the present disclosure, there provides an electronic device for an interleaved multiple access transmitting apparatus side, comprising: a processing circuit, configured to allocate a quadrature interleaver or a random interleaver for the transmitting apparatus in interleaved multiple access communication based on configuration parameters provided by an interleaved multiple access control terminal, wherein the quadrature interleaver or random interleaver is used to, when the transmitting apparatus is in interleaved multiple access communication with a receiving apparatus, distinguish the transmitting apparatus from other transmitting apparatus.

In one aspect of the present disclosure, there provides an electronic device for an interleaved multiple access receiving apparatus side, comprising: a processing circuit, configured to de-interleave data signal from a transmitting apparatus in interleaved multiple access communication with the receiving apparatus based on configuration parameters provided by an interleaved multiple access control terminal, wherein the configuration parameters comprise operation parameters of an interleaver of the transmitting apparatus in interleaved multiple access communication with the receiving apparatus, and the interleaver is used to distinguish the transmitting apparatus from other transmitting apparatus.

Some embodiments of the present disclosure improve the performance of an IDMA system by determining configuration parameters in the IDMA system, particularly operation parameters of an interleaver of a transmitting apparatus, based on communication characteristics between the transmitting apparatus and a receiving apparatus. Moreover, some embodiments of the present disclosure may make the IDMA system better suited to an environment including a large number of users and satisfy different QoS requirements of different users, by performing allocation of quadrature interleavers and random interleavers according to characteristics of different users, meanwhile the IDMA systems still can achieve good system performance in this environment. In addition, some embodiments of the present disclosure employ a layered IDMA system, so that resource allocation can be effectively performed according to characteristics of different users, and the system performance can be improved.

DESCRIPTION OF THE DRAWINGS

The embodiments of the invention are illustrated in the drawings by way of example and not limitation. Note that, in the present description and the drawings, the structural elements that have substantially the same functions and structures are denoted by the same reference numerals, and repeated descriptions of these structural elements are omitted. In the drawings:

FIG. 1A to 1C are block diagrams showing an IDMA system, in which FIG. 1A is a block diagram showing a transmitting apparatus of the IDMA system, FIG. 1B is a block diagram showing a multi-user detection circuit in a receiving apparatus of the IDMA system, and FIG. 1C is a block diagram of a quadrature multi-user detection circuit in the receiving apparatus of the IDMA system.

DETAILED DESCRIPTION OF PREFERRED EMBODIMENTS

Figure 1A:
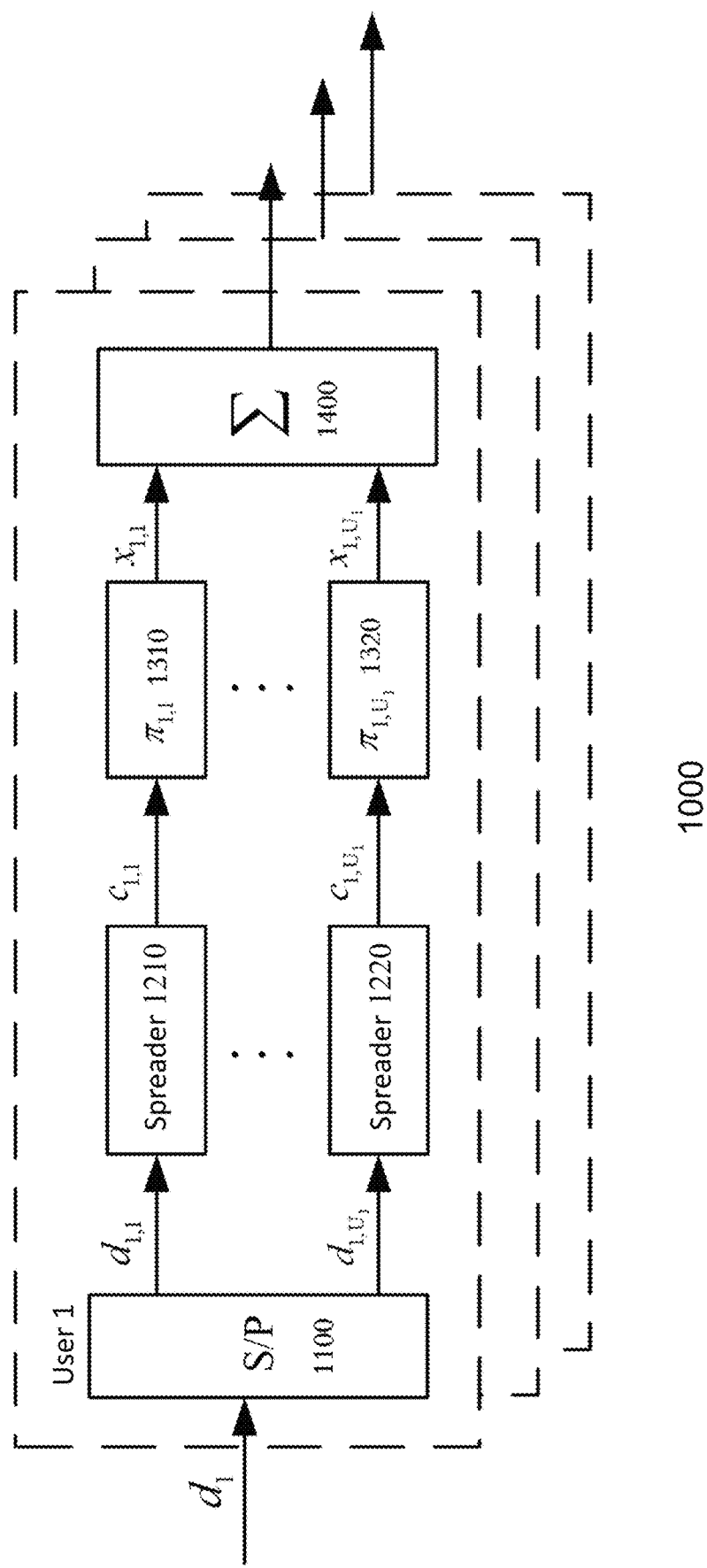

Embodiments related to electronic devices in an IDMA system will be described below. In the following description, numerous specific details are set forth for providing thorough understanding of the present invention. However, it is apparent that the invention may be practiced without these specific details. In other instances, well-known structures and devices are not described in detail to avoid unnecessarily obscuring, blocking or confusing the present disclosure.

Embodiments of the present invention will be described in the following order.
1. Overview of the IDMA system
2. Electronic device at control terminal
3. Electronic device at receiving apparatus side
4. Electronic device at transmitting apparatus side
5. Simulation results
6. Application examples
7. Conclusion

1. SYSTEM OVERVIEW

The IDMA system according to the present invention will be briefly described below.

The IDMA system includes a transmitting apparatus and a receiving apparatus. The transmitting apparatus has frequency spreaders and interleavers which have one-to-one correspondence therebetween. The transmitting apparatus spreads and interleaves a bit sequence to be transmitted by means of the spreaders and the interleavers, and then transmits the spreaded and interleaved sequence to a receiving apparatus through a channel. Where, different bit streams are distinguished by using different interleavers. The receiving apparatus has deinterleavers and despreaders, which have one-to-one correspondence therebetween, and correspond to the interleavers and the spreaders in the transmitting apparatus respectively. The transmitting apparatus deinterleaves and despreads the received bit sequence using the deinterleavers and despreaders to recover the data signal from the transmitting apparatus. Since the receiving apparatus of the IDMA system typically receives data streams from a plurality of transmitting apparatus, the receiving apparatus can have a plurality of sets of deinterleavers and despreaders corresponding to the plurality of transmitting apparatus. In addition, in a non-quadrature IDMA system, spreaders and interleavers may be superimposed in the receiving apparatus to reduce interference between respective data streams for multi-user detection.

Of course, devices commonly used in wireless communication, such as encoders, decoders, modulators, demodulators, etc., may also be included in the IDMA system, and here their description are omitted for the sake of clarity of the technical solution of the present invention.

In a configuration of an IDMA system, in accordance with a preferred embodiment of the present invention, the transmitting apparatus is implemented as a terminal device, such as a user equipment, and the receiving apparatus is implemented as a network access point, such as a base station device. In other words, a preferred embodiment of the present invention can perform IDMA configuration for a uplink transmission in an IDMA system. In other embodiments of MTC, D2D or V2 X involving multiple-to-one transmission, the receiving apparatus of the present invention may also be implemented as a terminal device or an infrastructure that receives data from other plurality of terminals, and in addition, the transmitting apparatus may also be implemented as an infrastructure for transmitting data to a central node, the infrastructure referred to here is, for example, an intelligent traffic light or an intelligent signal light in the intelligent transportation having an IDMA wireless communication module. In the following description, a part of contents are illustrated by exemplifying the user as the transmitting apparatus and the base station as the receiving apparatus, but those skilled in the art can perform reasonable combination, modification and expansion accordingly. In general, a user as a transmitting apparatus can be configured with an interleaver and a spreader correspondingly to transmit spreaded and interleaved signal to a receiving apparatus. The receiving apparatus can be configured with a deinterleaver and a despreader correspondingly, to deinterleave and despread the signals received from the transmitting apparatus.

Further, in an embodiment of the present invention, a layered IDMA system is also proposed. In a layered IDMA system, for a single user, a transmitting apparatus corresponding to the user may be configured with a plurality of spreaders and a plurality of interleavers, wherein one spreader and one interleaver form an IDMA layer, i.e., an IDMA unit. Respective users realize parallel transmission with different velocities by occupying different numbers of layers via serial-to-parallel conversion. The user data, after having been serial-to-parallel converted, enters a corresponding layer for spreading and interleaving, and the signals after spreading and interleaving in each layer are combined and transmitted to the receiving apparatus.

Deinterleavers and despreaders corresponding to the transmitting apparatus layer-by-layer are configured at the receiving apparatus side, that is, an IDMA layer of the transmitting apparatus has a corresponding deinterleaver and a corresponding despreader at the receiving apparatus. Each layer can be equivalent to a "virtual" sub-user of the user at the receiving side, and the receiving apparatus performs user detection in units of layers. The receiving apparatus processes the received signals through the corresponding deinterleaver and despreader of each layer, thereby separating out signals of respective layers to obtain a plurality of parallel signals. The parallel signals are then subjected to parallel-to-serial conversion to recover data signals of respective users at the transmitting apparatus side.

The interleaver and the spreader in the IDMA system can be implemented by means of hardware, firmware, software, and the like. In a case that the interleaver is implemented in hardware or firmware, a predetermined number of interleavers can be configured for the transmitting apparatus when the transmitting apparatus is manufactured. In the case of software implementation, such as a software radio, a predetermined number of interleavers may be configured for the transmitting apparatus by the software, according to an application situation.

A layered IDMA system according to an embodiment of the present invention will be described below with reference to FIGS. 1A to 1C. The layered IDMA system shown here is merely exemplary. Note that some solutions of the present invention (e.g., a solution using a Walsh code sequence or a solution involving allocation of quadrature interleavers) can also be applied to non-layered IDMA systems (i.e., one transmitting apparatus is configured with one spreader and one interleaver), or may be applied to a mixed case where a part of users correspond to layered IDMA and the other part of users correspond to non-layered IDMA.

Figure 1B:
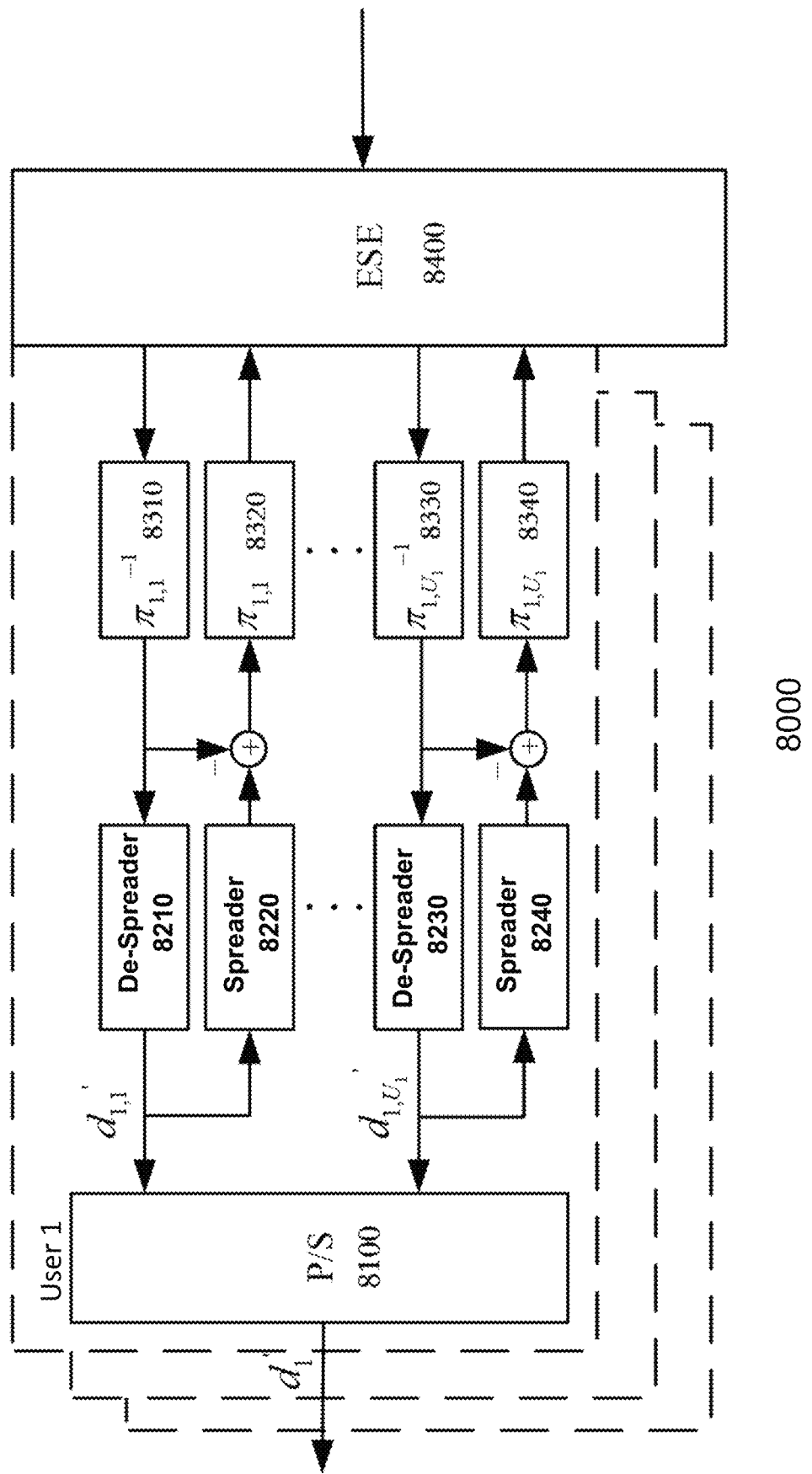
Figure 1C:
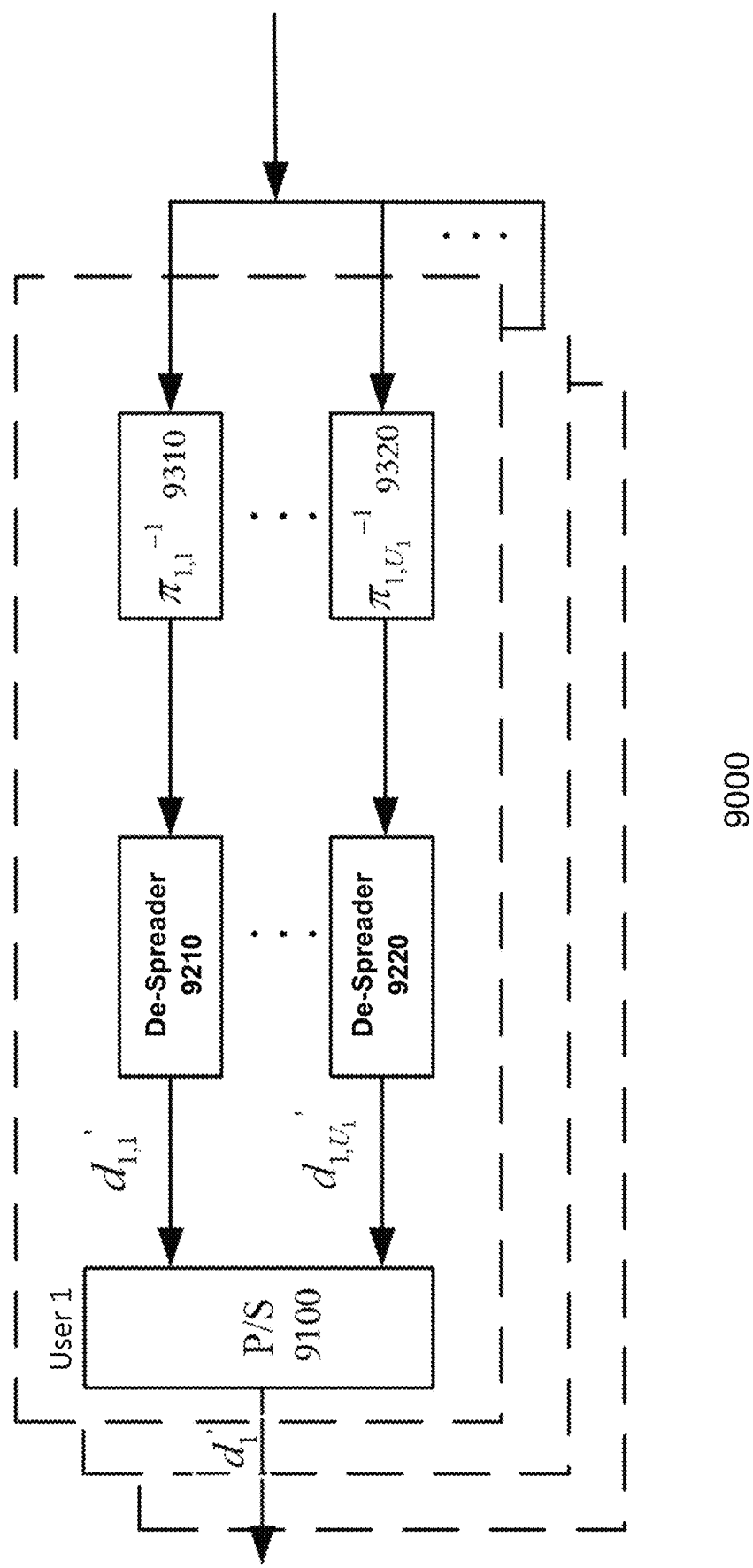

FIG. 1A is a block diagram showing a transmitting apparatus of an IDMA system, FIG. 1B is a block diagram showing a multi-user detection circuit in a receiving apparatus of an IDMA system, and FIG. 1C is a block diagram showing a quadrature multi-user detection circuit in a receiving apparatus of an IDMA system.

In the transmitting apparatus shown in FIG. 1A, the transmitting apparatus 1000 may include a serial-to-parallel converter S/P 1100, spreaders 1210, 1220, interleavers 1310, 1320, and an addition module 1400. FIG. 1A shows only one IDMA transmitting apparatus. Other IDMA transmitting apparatus have constructions similar to that shown in FIG. 1A, indicated by overlapped dashed boxes, and such IDMA transmitting apparatus occupy the same physical transmission resources to transmit signals to the receiving apparatus. In addition, FIG. 1A only shows that one transmitting apparatus (one user) is configured with $U_1$ (2) IDMA layers, but it should be understood that the transmitting apparatus can also be configured with a larger number of IDMA layers, depending on design and the application environment of the IDMA system.

The serial-to-parallel converter S/P 1100 converts an input serial sequence d1 corresponding to a user 1 of the transmitting apparatus 1000 into $U_1$ parallel sub-sequences $d_{1,1} \ldots d_{1,U1}$. Each sub-sequence is spreaded by a corresponding spreader. For example, the sub-sequence $d_{1,1}$ is spreaded by the spreader 1210 to obtain a spreading sequence $c_{1,1}$. The spreaded sub-sequences are interleaved by corresponding interleavers, for example, the spreading sequence $c_{1,1}$ is interleaved by the interleaver $\pi_{1,1}$ 1310 to obtain an interleaved sequence $x_{1,1}$. The sequences $x_{1,1} \ldots x_{1,U1}$, which have been spreaded and interleaved respectively, are added in the adder 1400 and then transmitted to the receiving apparatus.

A receiving apparatus in the IDMA system receives the interleaved sequences, and deinterleaves and despreads the interleaved sequences. For different types of interleavers used in the transmitting apparatus, the receiving apparatus includes corresponding multi-user detection circuits.

FIG. 1B is a block diagram showing an exemplary multi-user detection circuit 8000 at a receiving apparatus side, wherein the multi-user detection circuit is primarily directed to a case of employing non-quadrature interleavers in the transmitting apparatus (including employing hybrid non-quadrature interleavers and quadrature interleavers according to the present invention).

As shown in FIG. 1B, the multi-user detection circuit 8000 includes a basic signal estimator (ESE) 8400 for detecting data of the user 1, and typically also includes deinterleavers 8310, 8330, interleavers 8320, 8340, despreaders 8210 and 8230, and spreaders 8220 and 8240. Generally, the multi-user detection circuit 8000 is configured to detect data transmitted by multiple users occupying the same time slot and frequency, and thus may further include more sets of deinterleavers, interleavers, despreaders, and spreaders connected to the ESE 8400 for detecting data from other users than the user 1, such as in the underlying dashed box of FIG. 1B.

The signal received by the multi-user detection circuit 8000 is first processed by the basic signal estimator (ESE) 8400 to obtain a received sequence. The received sequence then enters into the deinterleavers 8310, 8330 for deinterleaving. The deinterleaved sequence then enters into the despreaders 8210, 8230 for despreading. The spreader 8220 and interleaver 8320 form a feedback path that feeds back the output of the despreader 8210 and deinterleaver 8310 back to the ESE 8400 to improve signal estimation processing in the ESE 8400. Similarly, the spreader 8240 and the interleaver 8340 also form a feedback path.

In one example of the present invention, the multi-user detection circuit 8000 is a turbo iterative structure that reduces interference between interleavers by means of multiple iterations such that the BER reaches a lower level. In particular, in such a structure, each sub-sequence of the received signal inherently interferes with other sub-sequences of the received signals, and the more accurate the detected signals are, the less interference on the other sub-sequence of signals after iterative processing is. A series of feedback processes (also corresponding to iteration) through de-interleaving, despreading, spreading, and interleaving for sub-sequences of received signals can improve accuracy of sub-sequence signal detection, and when the accurately detected signals are fed back to the ESE module for processing, the interference experienced by other sub-sequences of the received signals is reduced.

FIG. 1C is a block diagram showing a quadrature multi-user detection circuit 9000 in accordance with one embodiment of the present disclosure, which is primarily directed to a case where interleavers employed in the transmitting apparatus are quadrature interleavers.

The structure of the quadrature multi-user detection circuit 9000 is similar to that of the multi-user detection circuit 8000, except that the quadrature multi-user detection circuit 9000 does not include spreaders and interleavers, i.e., does not include a feedback path. For an IDMA system using quadrature interleavers, it can be considered that signals for different interleavers do not interfere with each other, so only signals output from an ESE (not shown in FIG. 1C) need to be deinterleaved and despreaded, without needing the feedback path as shown in FIG. 1B. The interleavers in the quadrature multi-user detection circuit 9000 are orthogonal to each other, so no iteration is required. Similar to the multi-user detection circuit 8000, the quadrature multi-user detection circuit 9000 may also include more groups of deinterleavers, despreaders for detecting data from other users than the user 1, such as in the underlying dotted box of FIG. 1C.

In accordance with a preferred embodiment of the present invention, a plurality of users occupying the same transmission resource utilize interleavers that are orthogonal to each other under a first condition, and further utilize non-quadrature interleavers, such as random interleavers, under a second condition. Accordingly, the receiving apparatus can have both the multi-user detection circuit 8000 and the quadrature multi-user detection circuit 9000, and a selector can be controlled by a controller according to the current condition, so as to select a corresponding multi-user detection circuit. In addition, in order to reduce the cost, the receiving apparatus may also have only the multi-user detection circuit 8000, and the signal estimator, the spreader, the interleaver and the adder are bypassed under a first condition by means of a controller's control, so that the multi-user detection circuit 8000 is converted to a quadrature multi-user detection circuit 9000. Here, the first and second conditions may be conditions related to information indicating a channel status of communication between the transmitting apparatus and the receiving apparatus.

Although the IDMA system has been described with reference to serial-to-parallel/parallel-to-serial converters, adders, signal estimators, etc. in the above description, it should be understood that the implementation of the present invention is not limited to these devices, that is, even if these devices are not present, the invention is also achievable and complete.

It should be understood that FIG. 1A through FIG. 1C and the description with reference to the drawings are primarily directed to an overview of a layered IDMA system. For a general IDMA system (non-layered), it is apparent that in the transmitting apparatus as shown in FIG. 1A, there is only one spreader and one interleaver (for example, 1210 and 1310) for the user 1, and any serial-to-parallel converter and adder will be omitted. However, in the multi-user detection circuit and the quadrature multi-user detection circuit of the receiving apparatus as shown in FIGS. 1B and 1C, only corresponding one deinterleaver and one despreader (8310 and 8320) exist, and the parallel-to-serial converter will also be omitted. Various electronic devices and processing methods thereof according to embodiments of the present disclosure will be described below in conjunction with several exemplary embodiments of the present disclosure.

2. ELECTRONIC DEVICE AT CONTROL TERMINAL

In an IDMA system according to the present invention, configuration parameters for a transmitting apparatus can be determined from information about IDMA communication between the transmitting apparatus and a receiving apparatus so as to improve performance of the IDMA system. An electronic device for determining configuration parameters for a transmitting apparatus of an IDMA system according to an embodiment of the present invention, which is an electronic device for an interleaved multiple access control terminal, will be described below.

In the IDMA system, the interleaved multiple access control terminal can be located separately from the transmitting apparatus and the receiving apparatus of the IDMA system, and for example, be a central control terminal separate from the transmitting apparatus and the receiving apparatus. In such case, in addition to the transmitting apparatus and the receiving apparatus, the IDMA system includes a central control terminal, and the electronic device is an electronic device located at the central control terminal. Alternatively, the interleaved multiple access control terminal may be integrated with the receiving apparatus as part thereof, and in such case, the electronic device is an electronic device located at the receiving apparatus side or may operate as a part of the receiving apparatus.

As an example, the electronic device may be a base station, a Node B, an e-NodeB, or the like in cellular communication, a terminal device in Machine Type Communication (MTC), or a key component thereof, such as a processing chip therein (such as an integrated circuit module that includes a single wafer) rather than a complete product. In a case where the receiving apparatus is a smart meter and the transmitting apparatus is a smart home appliance, the electronic device may be a small base station as a central control terminal or a cluster head among a plurality of transceivers, and the like, or a key component thereof, for example, a processing chip therein rather than a complete product.

Figure 2:
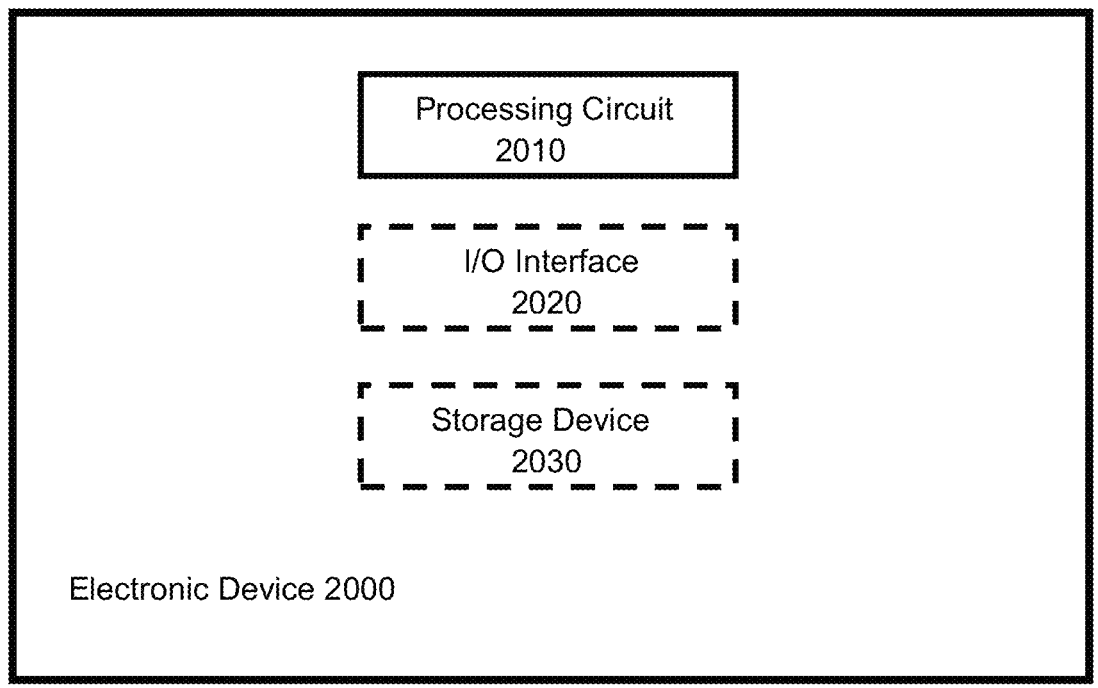
FIG. 2 is a block diagram showing an electronic device in accordance with an embodiment of the present disclosure.

FIG. 2 is a block diagram showing an electronic device 2000 for an interleaved multiple access control terminal in accordance with one embodiment of the present disclosure. As shown in FIG. 2, electronic device 2000 can include a processing circuit 2010. The processing circuit 2010 can be configured to acquire information about interleaved multiple access communication between a receiving apparatus and a transmitting apparatus; determine configuration parameters for the transmitting apparatus based on the information, the configuration parameters comprising operation parameters of an interleaver of the transmitting apparatus, the interleaver being used to distinguish the transmitting apparatus from other transmitting apparatus; and provide the determined configuration parameters to the transmitting apparatus, so that the transmitting apparatus is configured with the configuration parameters for communicating with the receiving apparatus.

When the electronic device 2000 is located at the central control terminal, the processing circuit 2010 may also provide the configuration parameters to the receiving apparatus such that the receiving apparatus can be configured based on the configuration parameters for communicating with the transmitting apparatus. In some embodiments, electronic device 2000 operates as a receiving apparatus. The processing circuit 2010 is further configured to perform processing of data signals from the transmitting apparatus based on the configuration parameters.

In some embodiments, preferably, electronic device 2000 may also include an input/output (I/O) interface 2020 for transmitting information to and receiving information from other electronic devices.

In some embodiments, preferably, the electronic device can also include a storage device 2030, which is configured to store information about interleaved multiple access communication between the receiving apparatus and the transmitting apparatus and configuration parameters for the transmitting apparatus.

In some embodiments, preferably, the storage device 2030 can be further configured to store a program that, when executed by the processing circuit in the electronic device, causes the processing circuit to perform processing operations described below. As an alternative embodiment, the program may also be stored in a storage of the electronic device that is different from the storage device 2030, or even in a storage outside the electronic device.

Information about Interleaved Multiple Access Communication Between the Receiving Apparatus and the Transmitting Apparatus In some embodiments, the information about interleaved multiple access communication between the receiving apparatus nd the transmitting apparatus acquired by the electronic device 2000 may include information indicating channel status of communication between the transmitting apparatus and the receiving apparatus, for example, channel quality information and channel direction information, wherein the channel quality information is characterized, for example, by received signal power strength (e.g., RSRP) or signal to noise ratio (e.g., SINR, CQI), and the channel direction information is characterized, for example, by CSI, particularly PMI, in the LTE protocol. The information indicating the channel status may be channel status information estimated based on statistical results of historical channel status, or may be current channel status information learned when the communication is performed.

For example, in a case where the electronic device 2000 is located at the receiving apparatus side, the acquired information may be obtained based on measurement and channel estimation of a pilot or reference signal received by the receiving apparatus from the transmitting apparatus at the time of communication. This information can be estimated by the receiving apparatus and provided to the electronic device. For example, the reference signal may be SRS (Sounding Reference Signal) or CSI-RS (Channel State Indication-Reference Signal) in an LTE system.

Or, in the case where the electronic device 2000 is located at an independent central control terminal, the acquired information may also be channel state information indicating channel quality or channel direction of the communication between the transmitting apparatus and the receiving apparatus, which can be subject to processing including quantization, encoding, etc., to be suitable for transmission, such as CSI including CQI, PMI, CDI. This information can be reported to the central control terminal after channel estimation by the transmitting apparatus or the receiving apparatus.

In some embodiments, additionally or alternatively, the information acquired by the electronic device 2000 may further include data transmission requirement information about data transmission between the transmitting apparatus and the receiving apparatus, the data transmission requirement information indicating one or more of data amount Q, e.g., the length of data in the upstream data buffer of the transmitting apparatus, and required data transmission velocity V of data transmission between the transmitting apparatus and the receiving apparatus, such as information included in BSR in the LTE system. For example, the data transmission requirement information may be the data amount or the required data transmission velocity of the data to be transmitted in the transmitting apparatus reported by the transmitting apparatus, or may be estimated by the receiving apparatus or the central control terminal based on the statistical result of historical communication.

In some embodiments, additionally or alternatively, the information acquired by the electronic device 2000 may include Number of Available Interleaver (NAI) information of the transmitting apparatus, the Number of Available Interleaver information indicating the number of interleavers available to the transmitting apparatus. In a conventional IDMA system, the number of interleavers available to the transmitting apparatus is one, while in a layered IDMA system, the number of interleavers available to the transmitting apparatus is greater than or equal to 1, as indicated above, which also indicates the maximum number of layers or the maximum number of units allowed by the transmitting apparatus at the current time.

Determination of configuration parameters for the transmitting apparatus, in particular the operating parameters of interleaver, based on the information about interleaved multiple access communication between the receiving apparatus and the transmitting apparatus will be described in detail.

Operating Parameters of Interleaver

As previously described, the processing circuit 2010 can determine the operating parameters of interleaver in the transmitting apparatus based on the acquired information, particularly information indicative of channel status of communication between the transmitting apparatus and the receiving apparatus. Here, the operating parameters of interleaver may include identification information characterizing the interleaver.

The identification information can optionally indicate the type of interleaver configured for the transmitting apparatus, and wherein the type of interleaver comprises quadrature interleaver and random interleaver. For quadrature interleavers, the construction sequences used by different interleavers are orthogonal to each other. For random interleavers, the construction sequences used by different interleavers are obtained by a specific random algorithm, and these construction sequences are not necessarily orthogonal. For example, the identification information may use a specific number or character to represent a quadrature interleaver, and use a different number or character to represent a random interleaver.

The identification information can optionally indicate algorithms for generating the interleaver configured for the transmitting apparatus. The generation algorithm of an interleaver includes a random interleaver generation algorithm or a quadrature interleaver generation algorithm. The random interleaver generation algorithm can include an algorithm for generating random interleaver based on tree-structure, as described above by Ahmed et al.; an algorithm for generating random interleaver based on prime number-structure as described above by Ruchir et al.; or other random interleaver generation algorithms well known in the art. The quadrature interleaver generation algorithm may include an algorithm for generating quadrature interleaver based on Walsh sequence according to an embodiment of the present invention which will be described below; an algorithm for generating quadrature interleaver based on M sequence; or other quadrature interleaver generation algorithm known in the art. In particular, for the quadrature interleaver generation algorithm, the algorithm for generating quadrature interleaver based on Walsh sequence is preferred. Because the algorithm for generating quadrature interleaver based on Walsh sequence can flexibly support usage of different spreading code lengths between respective transmitting apparatus, compared to the algorithm for generating quadrature interleaver based on M sequence.

Since the length of the construction sequence used by the quadrature interleaver is the same as the spreading code length, in a case that the spreading code lengths used by respective transmitting apparatus are not exactly the same, the orthogonality between construction sequences with different lengths used by quadrature interleavers is defined as: if a long construction sequence is divided into sub-sequences of equal lengths according to the length of a short construction sequence, the short construction sequence is orthogonal to any one of the sub-sequences. Thereby, it can be ensured that signals obtained by interleaving with interleavers having construction sequences of different lengths do not interfere with each other at the receiving apparatus.

Assume there are 5 users in a certain scenario (regardless of layering), where 2 users have a spreading length of 4 and the other 3 users have a spreading length of 8. In this scenario, it is not feasible to use M sequence, because M sequences of different lengths are not orthogonal to each other. The Walsh sequence can be well suited for this scenario, as it is possible to generate Walsh sequences of different lengths that are orthogonal to each other.

First, an 8th-order Hadamard matrix is generated, and the all 1 sequence on the first row of is removed, and the remaining are the required spreading sequence of length 8.

$$\text{Hadamard\_Matrix}_8 = \begin{pmatrix} +1 & +1 & +1 & +1 & +1 & +1 & +1 & +1 \\ +1 & +1 & +1 & +1 & -1 & -1 & -1 & -1 \\ +1 & +1 & -1 & -1 & +1 & +1 & -1 & -1 \\ +1 & +1 & -1 & -1 & -1 & -1 & +1 & +1 \\ +1 & -1 & +1 & -1 & +1 & -1 & +1 & -1 \\ +1 & -1 & +1 & -1 & -1 & +1 & -1 & +1 \\ +1 & -1 & -1 & +1 & +1 & -1 & -1 & +1 \\ +1 & -1 & -1 & +1 & -1 & +1 & +1 & -1 \end{pmatrix}$$

Users with a spreading length of 8 are allocated the first 3 lines, which are (+1, +1, +1, +1, −1, −1, −1, −1), (+1, +1, −1, −1, +1, +1, −1, −1) and (+1, +1, −1, −1, −1, −1, +1, +1). By observing the Hadamard matrix, it can be found that the first half of the 5th row and the first half of the 6th row are identical, being (+1, −1, +1, −1), and the first half of the 7th row and the first half of the 8th row are identical, being (+1, −1, −1, +1). Such two sequences of length 4 (i.e., (+1, −1, +1, −1) and (+1, −1, −1, +1)) can be allocated to 2 users requiring a spreading length of 4. At this time, the spreading sequences for such five users achieve fully orthogonal with each other.

Therefore, the algorithm for generating quadrature interleaver based on the Walsh sequence can support usage of different spreading code lengths in different receiving apparatus, thereby supporting implementation of different data transmission velocities at different receiving apparatus. Additionally, the spreading code length of the receiving apparatus can change over time, such that the Walsh sequence can also support data transmission with variable velocity for the receiving apparatus.

Thus, preferably, the Walsh sequence-based algorithm is applicable to a case where spreading information of all users are identical or not identical. Preferably, the M-sequence-based algorithm is applicable to a case where spreading information of all users are identical. In a specific application environment, an appropriate determination algorithm for quadrature interleaver can be selected according to the characteristics of the user.

In some embodiments, the identification information may take a particular number or character, such as number 0, representing a Walsh sequence-based quadrature interleaver algorithm, take a particular number or character, such as number 1, representing a M sequence-based quadrature interleaver algorithm, take a particular number or character, such as the number 2, representing a tree structure-based random interleaver algorithm, take a particular number or character, such as the number 3, representing a prime structure-based random interleaver algorithm. Of course, other forms can be used to characterize these interleaver algorithms as well as other interleaver algorithms.

A quadrature interleaver generation algorithm according to an embodiment of the present invention will be described below.

One possible algorithm for generating quadrature interleavers is based on a set of quadrature sequences with a correlation coefficient of zero thereamong (eg, a Walsh sequence or a M-sequence). The following describes the generation process of quadrature interleavers by taking the preferred Walsh sequence as an example: assuming that the spreading length of the spreader configured for the user in the transmitting apparatus is S, S-order walsh sequences is generated by expansion of a Hadamard matrix; after removing the first all-one sequence in the Hadamard matrix, the subsequent S-1 walsh sequences are obtained. Each of the S-1 walsh sequences can be used to construct a quadrature interleaver, also known as a construction sequences of quadrature interleavers.

Figures 3A, 3B:
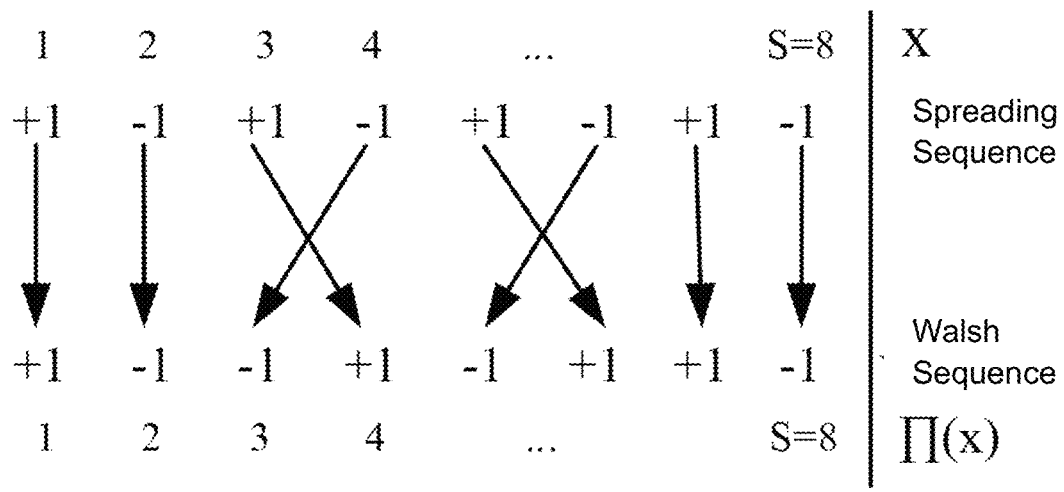
FIG. 3A is a diagram showing a mapping relationship between a spreading sequence and a walsh sequence, according to an embodiment of the present disclosure.
FIG. 3B is a schematic diagram showing the correspondence between a serial number and a walsh sequence, according to an embodiment of the present disclosure.

FIG. 3A shows a mapping relationship between a spreading sequence in an interleaver constructed using a Walsh sequence and a Walsh sequence: in a spreading block, +1 included in the spreading sequence (generally +1, −1, +1, −1, . . . ) is sequentially mapped to +1 in the Walsh sequence, and −1 in the spreading sequence is sequentially mapped to −1 in the Walsh sequence. The S-1 Walsh sequences correspond to the S-1 mapping relationships one by one. Such a mapping relationship also characterizes quadrature interleavers. Respective data bits (i.e., a sequences to be interleaved) corresponding to the spreading sequence are rearranged according to this mapping relationship, thereby obtaining interleaved sequences.

For example, in FIG. 3A, S=8, the spreading sequence is (+1, −1, +1, −1, +1, −1, +1, −1), and the Walsh sequence is (+1, −1, −1, +1, −1, +1, +1, −1), ($c^1$, $c^2$, $c^4$, $c^3$, $c^6$, $c^5$, $c^7$, $c^8$) can be obtained by interleaving corresponding data bits ($c'$, $c^2$, $c^3$, $c^4$, $c^5$, $c^6$, $c^7$, $c^8$) according to a mapping relationship II and can be regarded as a sequence that has been orthogonally interleaved.

Hereinabove the mapping relationship in a spreading block is described. Here, a spreading block refers to a minimum unit for spreading data, and the length of bits in the spreading block is identical with the spreading length S. One or more spreading blocks may be included in one interleaver. A quadrature interleaver can be obtained by extending the mapping relationship to all the spreading blocks in the interleaver. In the quadrature interleaver, different spreading blocks may use the same mapping relationship according to the same Walsh sequence, or may use different mapping relationships according to different Walsh sequences. The former has less signaling interaction, and the latter has higher security.

The identification information of the interleaver may also optionally correspond to a construction sequence of the interleaver. The construction sequence of the interleaver refers to a sequence that defines a mapping relationship characterizing the interleaver. For example, in the case of a quadrature interleaver, the construction sequence of the interleaver is, for example, a Walsh sequence or a M-sequence for constructing an interleaver as described above.

For example, the construction sequence of the interleaver can be indicated by numbering the construction sequence of the interleaver. Therefore, the identification information of the interleaver can include an index of the interleaver (IOI), that is, the serial number of the interleaver, so that the transmitting apparatus configures the corresponding interleaver.

FIG. 3B is a schematic diagram of correspondence between serial numbers and Walsh sequences, in accordance with one embodiment of the present disclosure. In FIG. 3B, the Walsh construction sequences used for orthogonal interleaving is represented by 3 bits. For example, when the serial number of a quadrature interleaver is 010, the corresponding (+1, +1, −1, −1, +1, +1, −1, −1) sequence can be used to define the mapping relationship within all spreading blocks in the interleaver, resulting in an quadrature interleaver. FIG. 3B shows only a case where the spreading length S=8. When the spreading length S is any other value, more or fewer bits may be used to represent the serial number of a construction sequence. For example, the number n of bits to be used can be determined according to $n=\log_2 S$. Of course, the serial number of an interleaver can also use other number or character.

The above description of an algorithm for generating quadrature interleavers based on Walsh sequence can be equivalently applied to an algorithm for generating quadrature interleavers based on M-sequence, which will not be described in detail herein.

In addition to the Walsh sequence, a M-sequence or other construction sequence for generating quadrature interleavers, even a random construction sequence for generating random interleavers may be numbered to be included in the identification information of interleavers as an index.

The identification information of an interleaver can be in various forms to indicate the interleaver type, the interleaver generation algorithm, and the construction sequence of the interleaver mentioned above. As an example, in the identification information of an interleaver, the type and generation algorithm of the interleaver can be indicated by adding one or more bits to the above serial number. For example, 5 bits can be used as the IOI. The first bit of the IOI may indicate the type of interleaver, for example, 0 indicates a quadrature interleaver and 1 indicates a random interleaver. The second bit of the IOI can indicate the generation algorithm of the interleaver. For example, in the case where the 1st bit indicates the quadrature interleaver, 0 in the 2nd bit indicates a Walsh sequence-based quadrature interleaver generation algorithm, and 1 in the 2nd bit represents a M-sequence-based quadrature interleaver generation algorithm. In the case where the 1st bit indicates the random interleaver, 0 in the 2nd bit indicates a tree structure-based random interleaver generation algorithm, and 1 in the 2nd bit indicates a prime structure-based random interleaver generation algorithm. Bits 3-5 of the IOI may indicate the serial number of the construction sequence. The order of the bits in the IOI indicating the type of interleaver, the generation algorithm, and the serial number may differ from the above examples, as long as the transmitting apparatus, the receiving apparatus, and the central control terminal (if any) have preappointed such order.

As another example, the identifier information of an interleaver may implicitly indicate the type, generation algorithm, or even sequence for the interleaver by using a predetermined number or character, for example, identifiers 0-7 correspond to respective construction sequences of Walsh sequence-based quadrature interleavers, 8-15 correspond to respective construction sequences of M-sequence-based quadrature interleaver, in other words, the identifiers in the range of 0-15 indicate quadrature interleavers, identifiers 16-23 correspond to respective construction sequences of tree structure-based random interleavers, identifiers 24-31 correspond to respective construction sequences of prime structure-based random interleavers, in other words, identifiers in the range of 16-31 indicate non-quadrature interleavers. The numbers 0-31 are merely exemplary, and numbers in other numerical ranges may also be used depending on the specific value of the spread length.

Of course, the identification information of the interleaver may also indicate the type, generation algorithm, or even sequence for the interleaver in some other specific manners, without being limited to the above exemplary description.

The mapping relationship between the construction sequence of an interleaver and the identification information of the interleaver or the serial number contained therein may be generated and stored in advance, in which case the transmitting apparatus and the receiving apparatus may retrieve construction sequences for interleaver according to the received identification information of interleaver. Alternatively, the mechanism for generating a constructor may be preappointed in the IDMA system, so that the transmitting apparatus or the receiving apparatus may generate corresponding construction sequences according to the received identification information of the interleaver by means of the preappointed generating mechanism.

How to configure interleavers of the transmitting apparatus in order to optimize operating parameters of interleavers of the transmitting apparatus will be described below with reference to an embodiment of the invention.

Selection of Quadrature Interleaver and Random Interleaver

In some embodiments, the processing circuit 2010 is configured to, when the receiving apparatus is in interleaved multiple access communication with a plurality of transmitting apparatus, give priority to allocation of a quadrature interleaver for a transmitting apparatus the channel status between which and the receiving apparatus meets with a predetermined condition. The predetermined condition may be one or more of channel quality, bit error rate, and dispersion degree of channel direction. In other words, processing circuit 2010 can be configured to give priority to allocation of a quadrature interleaver for a transmitting apparatus that meet the requirement of one or more of channel quality, bit error rate, and dispersion degree of channel direction. In general, a quadrature interleaver is preferentially allocated to a transmitting apparatus having good channel quality and/or low bit error rate and/or high dispersion degree of channel direction. Moreover, in some embodiments, in addition to allocate quadrature interleavers according to the channel status, the quadrature interleavers can be allocated according to QoS requirement of the transmitting apparatus, for example, a quadrature interleaver is preferentially allocated to a transmitting apparatus that requires high communication quality.

As an example, the processing circuit 2010 may set corresponding thresholds for one or more of channel quality, bit error rate, and dispersion degree of channel direction, such that a transmitting apparatus that the channel quality is above the threshold and/or the bit error rate is below the threshold and/or dispersion degree of channel direction is higher than the threshold can be a transmitting apparatus whose channel status meets a predetermined condition and can be allocated quadrature interleavers, wherein respective thresholds can be preset by the IDMA system, or can be adaptively set depending on communication status.

In this example, for example, assuming a total number N of quadrature interleavers, the processing circuit 2010 may select, from interleavers corresponding to a transmitting apparatus whose channel status meet a predetermined condition, N interleavers for allocation to the transmitting apparatus. The selected interleavers may be randomly selected or may be sequentially selected from interleavers corresponding to transmitting apparatus which are ordered according to a predetermined condition. For example, where the predetermined condition is a single condition, such as channel quality, the transmitting apparatus may be ordered from high to low according to the channel quality. In the case where the predetermined conditions are a plurality of conditions, weights may be assigned to different conditions to comprehensively consider respective conditions to obtain a score about channel status of the transmitting apparatus, the better the channel status is, the higher the score is, and the transmitting apparatus may be ordered from high to low according to the score of channel status. Thereby, quadrature interleavers can be sequentially allocated to the ordered transmitting apparatus.

Of course, if the number of interleavers corresponding to transmitting apparatus which meet the predetermined condition is less than N, all the transmitting apparatus that meet the predetermined condition will be allocated with quadrature interleavers, for example, randomly or in order as described above, and rest of quadrature interleavers are randomly allocated to other transmitting apparatus.

It should be understood that in a conventional IDMA system, each transmitting apparatus is configured with a single interleaver, that is, corresponds to a single interleaver, and thus selection of an interleaver actually means selection of a transmitting apparatus. Meanwhile, in a layered IDMA system, each transmitting apparatus can be configured with at least one interleaver, and interleavers corresponding to the transmitting apparatus actually are interleavers with which the transmitting apparatus is configured. Here, the number of interleavers with which each transmitting apparatus is configured may be preset or may be set according to communication status of the IDMA system, which will be described below.

As another example, processing circuit 2010 may directly order transmitting apparatus with respect to predetermined conditions, as described previously, and allocate quadrature interleavers to a first predetermined number of ordered transmitting apparatus. The predetermined number may be M, that is, the total number of interleavers corresponding to M transmitting apparatus is less than or equal to the total number of quadrature interleavers that are available for allocation, and the total number of interleavers corresponding to M+1 transmitting apparatus should be greater than or equal to the total number of quadrature interleavers that are available for allocation. Alternatively, the predetermined number may be M+1. In this case, the quadrature interleavers can also be allocated randomly or in order, for example, as previously described.

For another point of view, this example can also be equivalently regarded as a case where the threshold is set according to the communication status, that is, the threshold can be equivalently set according to the channel status of the transmitting apparatus, the number of interleavers used, and the predetermined number, such that the transmitting apparatus for which the communication condition is greater than or equal to the threshold is the transmitting apparatus that meets the predetermined condition.

Determination of the predetermined number will be exemplarily described below. It is assumed that the kth transmitting apparatus uses $NIU_k$ interleavers.

In one embodiment, it is assumed that all transmitting apparatus use the same spreading code length S. In this case, construction sequences of respective interleavers have the same length, that is, S. The total number of quadrature sequences is S-1, that is, S-1 quadrature interleavers are available for allocation. The total number of interleavers required for K transmitting apparatus is:

$$NIU_{sum}=\Sigma_{k=1}^{K} NIU_k, \qquad (1)$$

If for K, $NIU_{sum} \leq S-1$, and for K+1, $NIU_{sum} \geq S-1$, the number K or K+1 may be the predetermined number, so that the predetermined number of transmitting apparatus can be configured with quadrature interleavers.

In one embodiment, different transmitting apparatus may use different spreading code lengths, and it is assumed that the spreading code length used by transmitting apparatus k is $S_k$.

In this case, since the spreading code lengths are different between the transmitting apparatus, lengths of construction sequences of respective interleavers are also different. Taking the Walsh sequence being the construction sequence of interleaver as an example, for example, it is assumed that the spreading code length of the user 1 is 4, the length of the corresponding Walsh sequence is 4; the spreading code length of the user 2 is 8, and the corresponding Walsh sequence is 8. In a case where all transmitting apparatus use the same spreading code length S, the number of walsh sequences that can be simultaneously used is S−1, that is, be same as the value of the spreading code length. However, in the case of inconsistencies existing between the spreading code lengths used by all transmitting apparatus, in order to maintain orthogonality between Walsh quadrature sequences, the number of Walsh quadrature sequences that can be simultaneously used is no longer equal to the spreading code length. The length is as follows.

In the design of quadrature sequences, a Walsh sequence of length 4 can generate two corresponding walsh sequences of length 8. In this case, a Walsh sequence of length 4 is not orthogonal to the corresponding two Walsh sequences of length 8. Therefore, if a Walsh sequence of length 4 is used, the corresponding two Walsh sequences of length 8 cannot be used. Otherwise, the orthogonality between the interleavers will be destroyed.

Therefore, in the case of inconsistencies between the spreading lengths used by all transmitting apparatus, it is necessary to design a new mechanism to ensure that the orthogonality between quadrature interleavers used by respective transmitting apparatus is not destroyed. The following describes how to determine the predetermined number to ensure that the orthogonality between quadrature interleavers used by transmitting apparatus is not destroyed in the case of inconsistencies existing between the spreading lengths used by all transmitting apparatus, in accordance with one or more embodiments of the present invention.

For example, an equivalent total number of interleavers that K transmitters need to use can be calculated according to equation (2):

$$ENIU_{sum} = \sum_{k=1}^{K} \left( NIU_k * \frac{S_{max}}{S_k} \right) \quad (2)$$

Where $S_{max} = \{S_1, S_2, \ldots, S_K\}$ is a maximum spreading code length in all transmitting apparatus. If for K, $ENIU_{sum} \leq S_{max}-1$, and for K+1, $ENIU_{sum} > S_{max}-1$, then the K transmitting apparatus can be configured with quadrature interleavers while the orthogonality between the quadrature interleavers simultaneously used can be guaranteed to be not destroyed. In some embodiments, the number K or K+1 may be the predetermined number.

It should be noted that the spreading code length S or $\{S_1, S_2, \ldots, S_K\}$ involved in the above description may be preset, or may be set according to the communication status of the IDMA system, as will be described later.

It should be noted that quadrature interleavers may be arbitrarily allocated for the selected transmitting apparatus, that is, the correspondence between each quadrature interleaver and each selected transmitting apparatus may be arbitrarily set. For example, quadrature interleavers may be sequentially allocated to each transmitting apparatus by serial number, or may be allocated to each transmitting apparatus in other orders.

As an example, when a plurality of quadrature interleavers are allocated for one transmitting apparatus, the plurality of quadrature interleavers may be sequentially allocated to the transmitting apparatus by serial number. In this case, in order to reduce the signaling overhead and improve the system performance, it is only necessary to notify the transmitting apparatus of the starting serial number and the number of the interleavers to be allocated, because the serial number of any following interleaver can be derived from the starting serial number, as follows:

$$IOI_{k,i} = IOI_{k,1} + (i-1)_2, 1 \leq i \leq NIU_k$$

$IOI_{k,1}$ represents the start serial number of the interleaver, $IOI_{k,i}$ represents the serial number of the i-th interleaver, and $(i)_2$ represents the binary conversion of the decimal number i.

For example, the transmitting apparatus has a NIU value of 4 and a starting IOI information of 00010, wherein a first bit of 0 indicates that a quadrature interleaver is used, a second bit of 0 indicates that a Walsh sequence algorithm is used, and the following three bits indicate the serial number of the quadrature interleaver. In this case, as shown in the above equation, the corresponding three remaining IOI information are 00011, 00100, 00101, respectively.

Preferably, in a case where the amount of transmitting apparatuses or interleavers corresponding to the transmitting apparatuses is greater than the amount of quadrature interleavers available for allocation, the processing circuit 2010 can be configured to, when the quadrature interleavers have been allocated, allocate random interleavers to remaining transmitting apparatus. For example, after quadrature interleavers have been allocated as described hereinbefore, random interleavers can be allocated for the remaining transmitting apparatus. Here, the allocation of random interleavers can be performed in any manner and will not be described in detail herein.

Further, as an example, before the allocation of quadrature interleavers, or after the allocation of quadrature interleavers and before the allocation of the random interleaver, an operation may be performed to determine whether it is necessary to allocate a random interleaver.

The determination operation can be performed according to the above equations (1) or (2), where K is set as the total number of transmitting apparatus, and $NIU_{sum}$ or $ENIU_{sum}$ is the total number of interleavers corresponding to the transmitting apparatus. In the case of $NIU_{sum} > S-1$ or $ENIU_{sum} > S_{max}-1$, it can be considered that it is necessary to allocate random interleavers.

In addition, assuming that the maximum number of interleavers that the IDMA system can support is $NIU_{max}$, the processing circuit 2010 shall ensure that $NIU_{sum} \leq NIU_{max}$ and $ENIU_{sum} \leq NIU_{max}$ in the above embodiment is satisfied at allocation of interleavers for the transmitting apparatus.

The determination of operating parameters and allocation of interleavers according to an embodiment of the present disclosure have been described above. As described above, through, based on information about interleaved multiple access communication between a receiving apparatus and a transmitting apparatus, particularly information indicating channel status of communication between the transmitting apparatus and the receiving apparatus, determining operation parameters of interleavers configured for the transmitting apparatus, appropriate interleavers, including quadrature interleavers or random interleavers, can be configured for the transmitting apparatus side according to the communication status, thereby improving the performance of the IDMA system, and be better adapt to an environment of a large amount of users.

In particular, the operating parameters of interleavers are set such that quadrature interleavers are preferentially allocated to the transmitting apparatus with good channel status, and then random interleavers are allocated for the remaining transmitting apparatus, so that the number of users that the IDMA system can support can be increased by means of low interference between the quadrature interleavers. In addition, the quadrature interleavers are preferentially allocated to the transmitting apparatus with good channel quality, so that the data of such transmitting apparatus can be accurately detected and eliminated as interference from the overall signal to continue detection of data signals of other transmitting apparatus, thereby reducing BER of the IDMA system, etc., and improving overall performance of the IDMA system.

In particular, in the case of mixing quadrature interleavers and random interleavers, considering that each interleaver will be interfered by any other interleaver that is not orthogonal to the interleaver, the receiving apparatus will perform iterative detection by means of a multi-user detection structure (such as the multi-user detection structure 8000 described above). In operation, for the purpose of detecting signals of a specific transmitting apparatus or IDMA layer, the ESE module subtracts signals of other transmitting apparatus or IDMA layers from the total received signal, and then obtain the estimated signal for the specific transmitting apparatus by means of de-interleaving and despreading. The estimated signal can be fed back to the ESE module via the spreader and interleaver to help reduction of interference between signals during the next iteration.

During the detection process, for signals from a specific transmitting apparatus or a specific IDMA layer of the transmitting apparatus, signals from other transmitting apparatus or IDMA layers can be regarded as interference, and the more accurate the signal fed back to the ESE is, the smaller the interference for detection of other signals is. In the case of mixing quadrature interleavers and random interleavers according to an embodiment of the present application, the estimated signals for a transmitting apparatus using quadrature interleavers can be more accurately detected and decoded in a multi-user iterative detection process, so that the signal fed back to the ESE is more accurate. The improvement of accuracy of the signal fed back to the ESE will cause the interference of the signal on the signal detection for other transmitting apparatus or the IDMA layers to be less, even as if the signal corresponding to the quadrature interleaver has been removed from the overall signal and does not serve as interference, so that the detection accuracy for signals of other transmitting apparatus is also improved, thereby improving the overall performance of the IDMA system.

Moreover, the quadrature interleaver has an advantage of reducing the interference experienced by a transmitting apparatus using the quadrature interleaver, i.e., the transmitting apparatus is interfered only by transmitting apparatus using non-quadrature interleavers. For the IDMA system, the interference between the transmitting apparatus with good channel status accounts for a larger proportion of the total interference. Allocating quadrature interleavers to transmitting apparatus with good channel status can reduce mutual interference between the transmitting apparatus with good channel status, thereby greatly reducing the total interference between transmitting apparatus.

Spreading Length Information

As described above, the construction sequence of an interleaver and the number of quadrature interleavers are related to the spreading length S, the spreading length information relates to the spreading length of a spreader for the transmitting apparatus. It should be noted that in the context of description of the present application, the meaning of "spreading length" and "spreading code length" are equivalent and can be used interchangeably.

During communication, the spreading code length S may be known to each apparatus in the IDMA system and may be determined by various methods, for example, may be determined based on a conventional spreading code length determining method, or may be determined based on the following spreading code length determining method as proposed by the present disclosure.

The spreading code length determination according to an embodiment of the present application will be described in detail below.

In some embodiments of the present disclosure, preferably, the processing circuit 2010 may be further configured to determine a spreading code length of a spreader at the transmitting apparatus side. Therefore, the configuration parameters determined by the processing circuit 2010 can further comprise information about spread code length indicating spread code length of a spreader for the transmitting apparatus, and the processing circuit 2010 is configured to determine the spread code length based on the data transmission requirement information.

The data transmission requirement information is information about data transmission between the transmitting apparatus and the receiving apparatus, such as information indicating one or more of data amount and data transmission velocity, which may be included in the acquired information about the interleaved multiple access communication between the receiving apparatus and the transmitting apparatus as described above, or may be otherwise obtained.

The determination of the spreading code length will be described below with respect to a case where the data transmission requirement information indicates one or more of data amount and required data transmission velocity of data to be transmitted by the transmitting apparatus. It should be noted that in a case where the data transmission requirement information is estimated based on a statistical result of historical data communication, the following determination method is still applicable to make determination based on the estimated information, for example, the estimated data amount and data transmission velocity of the data transmission.

In one example, the processing circuit 2010 may determine the spreading code length based on the data amount Q of the data to be transmitted by the transmitting apparatus as indicated by the data transmission requirement information.

For the $k^{th}$ transmitting apparatus, it is assumed that the data amount of the data to be transmitted is $Q_k$, the interleaver depth is L, and the amount of data blocks independently decoded in one scheduling period (i.e., one reconfiguration period) is P, and the number of available interleaver is $NAI_k$. The amount of interleavers available to the transmitting apparatus refers to the maximum number of interleavers with which the transmitting apparatus can be configured. The processing circuit can determine the spreading code length $S_k$ of the transmitting apparatus k according to the following equation.

$$S_k = 2^{\left\lfloor \log_2 \frac{L*P*NAI_k}{Q_k} \right\rfloor} \tag{3}$$

where, $\lfloor \cdot \rfloor$ means rounding down.

The spreading code length $S_k$ determined according to the equation (3) is the maximum spreading code length in the case where the transmission requirement of the transmission device k for the data amount is satisfied. This method is suitable for a case where the scheduling period is short.

In another example, the processing circuit 2010 may also determine the spreading code length based on the data transmission velocity V required by the transmitting apparatus indicated by the data transmission requirement information. For example, the processing circuit can determine the spreading code length $S_k$ of the transmitting apparatus k according to the following equation.

$$S_k = 2^{\left\lfloor \log_2 \frac{L*NAI_k}{V_k} \right\rfloor} \quad (4)$$

Where $V_k$ represents the data transmission velocity required by the transmitting apparatus k, and the definition of symbols L, $NAI_k$, and $\lfloor \cdot \rfloor$ are the same as that for equation (3). This method is suitable for a case where the scheduling period is long.

The spreading code length $S_k$ determined according to equation (4) is the maximum spreading code length in the case where the transmission requirement of the transmission device k for the data transmission velocity is satisfied.

In the above equations (3) and (4), the parameter $NAI_k$ may be reported by the transmitting apparatus to the processing circuit 2010, or may be a fixed value preappointed among respective apparatus in the IDMA system. Furthermore, $NAI_k=1$ corresponds to a conventional IDMA system, i.e., a non-layered IDMA system, in which case this parameter can be omitted from equations (3) and (4).

In yet another example, the spreading code length $S_k$ for the transmitting apparatus k may be determined based on both the data amount $Q_k$ and the required data transmission velocity $V_k$ of the data to be transmitted by the transmitting apparatus k. For example, $S_k$ may be determined as the minimum of the values determined by equations (3) and (4).

In some embodiments, the processing circuit 2010 can be configured to, when the receiving apparatus is in interleaved multiple access communication with a plurality of transmitting apparatus, determine spread code lengths for the plurality of transmitting apparatus separately, and take the minimum among the determined spread code lengths as a common spread code length for the plurality of transmitting apparatus.

For example, for the transmitting apparatus 1 to K in communication with the receiving apparatus, the processing circuit 2010 can determine a spreading code length S common to the transmitting apparatus 1 to K according to the equation (5).

$$S = \min_{1 \le k \le K} S_k \quad (5)$$

Wherein, $S_k$ is determined according to the above equations (3) or (4). This method can select a uniform spread code length which is as large as possible while satisfying transmission requirements of K transmitting apparatus simultaneously, so as to obtain the largest possible spreading gain, thereby improving the overall performance of the system.

Furthermore, the plurality of transmitting apparatus can also be grouped and a common spreading code length can be determined for each group of transmitting apparatus. In a group of transmitting apparatus, the spreading code lengths for respective transmitting apparatus are the same. The spreading code lengths may be the same or different between different groups. In this case, the processing circuit 2010 may be configured to determine, for each group of transmitting apparatus, a spreading code length common to the group of transmitting apparatus according to the above equation (5), that is, determine the spreading code length as the minimum of $S_k$ determined for each transmitting apparatus in the group according to the above equations (3) or (4).

In a case of determining a common spreading code length for a plurality of transmitting apparatus and a case of grouping the transmitting apparatus and determining a common spreading code length for each group of transmitting apparatus, the spreading code length information may be transmitted by means of broadcast or packet broadcasting to the transmitting apparatus or the receiving apparatus (when the electronic device 2000 is not located at the receiving apparatus side).

The determination of the spreading code length in the above embodiment can select a maximum spreading code length for respective transmitting apparatus while satisfying different transmission requirements of different transmitting apparatus, so as to obtain the largest possible spreading gain, thereby improving the overall system performance.

Number of Interleavers for a Transmitting Apparatus

It has been described above that a transmitting apparatus can utilize one or more interleavers for data transmission. The number of interleavers used by the transmitting apparatus in actual communication should be less than the number of interleavers available to the transmitting apparatus. In communication, the number of interleavers used by the transmitting apparatus may be pre-specified and remain unchanged during communication, or the number of interleavers used by the transmitting apparatus may be determined based on information about the interleaved address access communication between the receiving apparatus and the transmitting apparatus.

The determination of the number of interleavers used by the transmitting apparatus according to an embodiment of the present invention will be described below.

Preferably, in some embodiments, processing circuit 2010 may also specify the number of interleavers used by the transmitting apparatus. For example, the configuration parameters determined by the processing circuit 2010 may further include information specifying the number of interleavers used by the transmitting apparatus, wherein the processing circuit 2010 is configured to determine the number of interleavers based on requirement for data transmission between the transmitting apparatus and the receiving apparatus, the number of available interleavers of the transmitting apparatus and the determined spreading length.

The requirements for data transmission between the transmitting apparatus and the receiving apparatus described herein may have the same meaning as the data transmission requirement information described above. That is, the requirement for data transmission may be the data amount or the required data transmission velocity of the data to be transmitted in the transmitting apparatus reported by the transmitting apparatus, or may be estimated by the receiving apparatus or the central control terminal based on the statistical result of historical communication.

The number of available interleavers of the transmitting apparatus indicates the maximum number of interleavers available to the transmitting apparatus, which may be included in the acquired information about the interleaved multiple access communication between the receiving apparatus and the transmitting apparatus, or it may be obtained in other ways.

In one example, the processing circuit 2010 may determine the number of interleavers used by the transmitting apparatus based on the data amount Q of the data to be transmitted by the transmitting apparatus as indicated by the data transmission requirement information. For example, the processing circuit can determine the number $NIU_k$ of interleavers used by the transmitting apparatus k, according to equation (6):

$$NIU_k = \lceil Q_k * S/(L*P) \rceil \qquad (6)$$

Where $\lceil \cdot \rceil$ indicates rounding up, the definition of the symbols $Q_k$, L, and P are the same as that in equation (3), and S is the spreading code length.

Here, if the determined number $NIU_k$ of interleavers is greater than the number $NAI_k$ of available interleavers for the transmitting apparatus, the number $NIU_k$ of interleavers used by the transmitting apparatus can be set to the number $NAI_k$ of available interleavers.

The number $NIU_k$ of interleavers determined according to equation (6) is the minimum number of interleavers used in the case where the transmission requirement of transmission apparatus k for the data amount can be satisfied. This method is suitable for a situation where the scheduling period is short.

In another example, the processing circuit 2010 may also determine the number of interleavers used by the transmitting apparatus based on the required data transmission velocity V of the transmitting apparatus indicated by the data transmission requirement information and the number of available interleavers for the transmitting apparatus and the determined spreading length. For example, the processing circuit 2010 can determine the number $NIU_k$ of interleavers used by the transmitting apparatus k, according to equation (7).

$$NIU_k = \lceil V_k * S/L \rceil \qquad (7)$$

Where $\lceil \cdot \rceil$ indicates rounding up, $V_k$ indicates the data transmission velocity required by the transmitting apparatus k, L is defined similar with that for equation (3), and S is the spreading code length.

Here, if the determined number of interleavers $NIU_k$ is greater than the number of available interleavers of the transmitting apparatus $NAI_k$, the number $NIU_k$ of interleavers used by the transmitting apparatus k can be set to the number $NAI_k$ of available interleavers.

The number $NIU_k$ of interleavers determined according to equation (7) is the minimum number of interleavers in the case where the requirement of the transmission device k for the data transmission velocity can be satisfied. This method is suitable for a case where the scheduling period is long.

In yet another example, the number of interleavers used by the transmitting apparatus can be determined based on both the data amount and the required data transmission velocity of the data to be transmitted by the transmitting apparatus. For example, for the transmitting apparatus k, $NIU_k$ can be determined as the minimum of the values determined in the two examples of employing equations (6) and (7) as described above.

In the above equations (6) and (7), the spreading code length S may be a length preappointed among apparatus in the IDMA system, or may be a length determined based on a conventional spreading code length determining method, or may also be a spreading code length determined according to an embodiment of the present invention.

In the above equations (6) and (7), the parameters Q and V are the data amount and the required data transmission velocity of the data to be transmitted in the transmitting apparatus as reported by the transmitting apparatus, respectively. Of course, as described above, they can be the data amount and the data transmission velocity in the data transmission estimated by the receiving apparatus or the central control terminal based on the statistical result of the historical communication.

The determination of the number of interleavers in the above embodiments can ensure that the allocated interleavers are as few as possible while respective transmission requirements of different transmitting apparatus being satisfied, so as to maximize utilization of the interleavers and increase the amount of users that the system can support. Thus, it is better suitable to a large-user environment.

It should be noted that the three types of setting of configuration parameters as enumerated above may be performed independently of each other or may be performed in combination with each other. In the case of performing in combination with one another, the obtained beneficial effects are also a combination of respective beneficial effects.

In some embodiments, when the electronic device further comprises a storage device 2030, the storage device is configured to store information about interleaved multiple access communication between the receiving apparatus and a transmitting apparatus, information for determining configuration parameters, and configuration parameters for the transmitting apparatus. For example, the memory 2030 may pre-store a mapping relationship between the construction sequence of an interleaver and its number. The memory 2030 may also pre-store one or more of the interleaver depth, the amount of data blocks independently decoded in one scheduling period, and the data transmission requirement information of the transmitting apparatus estimated based on the statistical result of the historical communication. The memory 2030 may store one or more of a spreading code length S preappointed among respective apparatus of the IDMA system, a number of available interleavers NAI, or a number of interleavers NIU used by the transmitting apparatus.

In some embodiments, preferably, the memory 2030 is further configured to store a program that, when executed by a processing circuit in the electronic device, causes the processing circuit to perform any one or combination of various processing operations as described above. For example, the program may cause the processing circuit to perform operations such as determining configuration parameters for a transmitting apparatus based on information, providing configuration parameters to the transmitting apparatus and/or the receiving apparatus, allocating interleavers and/or time-frequency resources, de-interleaving and despreading the data signals, and so on.

In some embodiments, when the receiving apparatus is in interleaved multiple access communication with a plurality of transmitting apparatus, the processing circuit 2010 is further configured to allocate the same time-frequency resource to the plurality of transmitting apparatus for the interleaved multiple access communication between the receiving apparatus and the plurality of transmitting apparatus. In this case, since the plurality of transmitting apparatus occupy the same time-frequency resource, the plurality of transmitting apparatus cannot be distinguished in the time domain and the frequency domain. However, since the plurality of transmitting apparatus can use different interleavers, the plurality of transmitting apparatus can be distinguished by means of interleavers.

In some embodiments, where the electronic device 2000 is located at the central control terminal, the processing circuit 2010 can also provide the determined configuration parameters to the receiving apparatus, such that the receiving apparatus can be configured according to the configuration parameters to process signals from the transmitting apparatus. For example, the receiving apparatus can configure an interleaver, a spreader, etc., corresponding to the transmitting apparatus to deinterleave and despread the data signal from the transmitting apparatus. In some embodiments, electronic device 2000 can operate as a receiving apparatus. The processing circuit 2010 is further configured to perform deinterleaving and despreading the data signals from the transmitting apparatus based on the configuration parameters.

Figure 4:
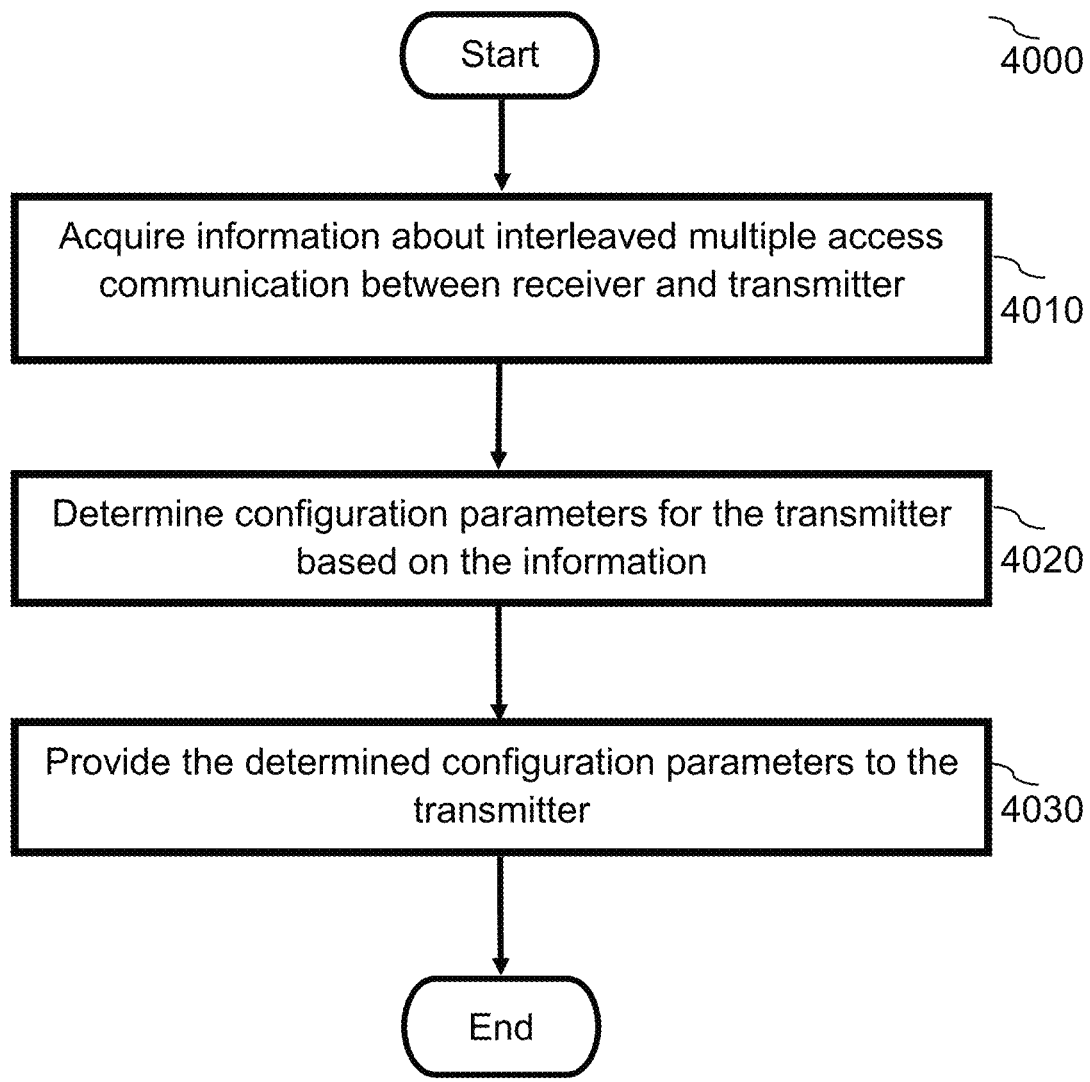
FIG. 4 is a flow chart showing a method for interleave multiple access communication, in accordance with an embodiment of the present disclosure.

The specific details of the electronic device 2000 for an interleaved multiple access control terminal in accordance with one embodiment of the present disclosure are described above. Accordingly, the present disclosure proposes a method for interleaved multiple access communication, the method can implement functions similar to those implemented by the electronic device as described above. The method can be applied to the electronic device 2000 as described above, or can be implemented by other electronic devices to achieve similar functions. FIG. 4 illustrates a method 4000 for interleaved multiple access communication, in accordance with one embodiment of the present disclosure.

Referring to FIG. 4, at step 4010, information about interleaved multiple access communication between a receiving apparatus and a transmitting apparatus is acquired. At step 4020, configuration parameters for the transmitting apparatus are determined based on the information, the configuration parameters comprising operation parameters of an interleaver of the transmitting apparatus, the interleaver being used to distinguish the transmitting apparatus from other transmitting apparatus. At step 4030, the determined configuration parameters are provided to the transmitting apparatus, so that the transmitting apparatus is configured with the transmitting parameters for communicating with the receiving apparatus.

The specific implementation of the steps 4010-4020 can be implemented in the manner described above in an exemplary manner, and therefore will not be further described herein.

As already mentioned above, the electronic device 2000 may be an electronic device at the receiving apparatus side, or an electronic device at a central control terminal separate from the receiving apparatus. The communication flow in these two cases will be separately described below.

Figure 5A:
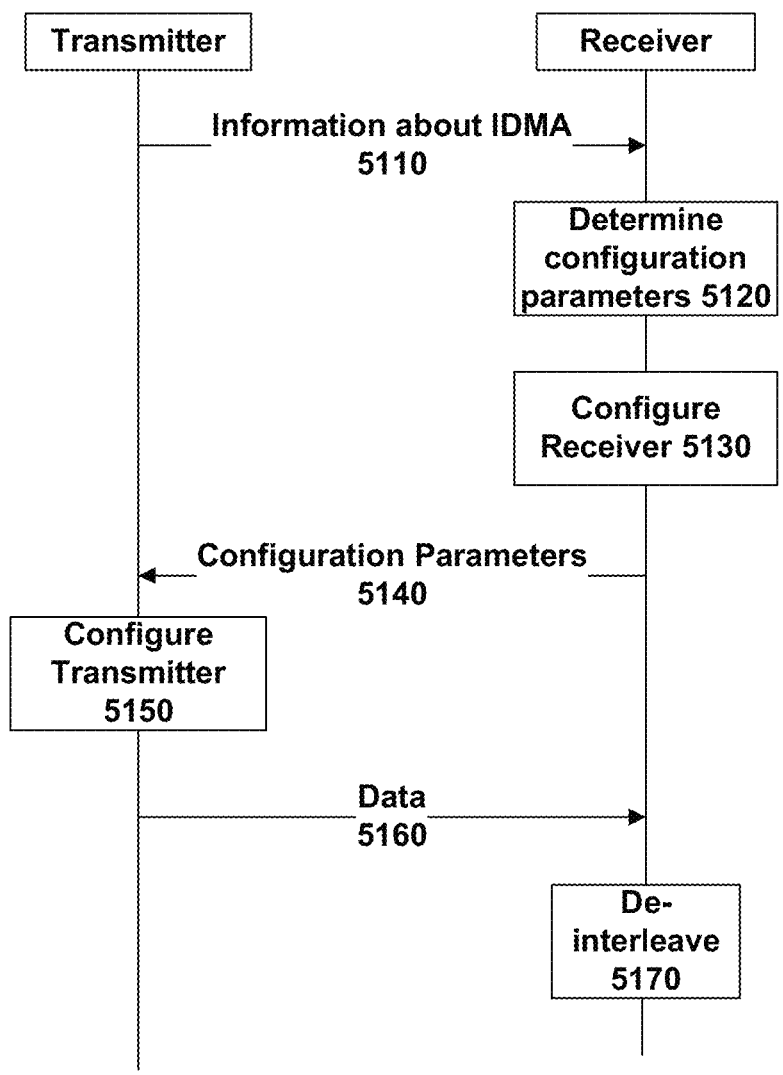
FIG. 5A is a flow chart showing communication of an IDMA system in accordance with an embodiment of the present disclosure.

FIG. 5A is a flowchart showing the communication of an IDMA system according to an embodiment of the present disclosure in a case where the electronic device 2000 is an electronic device at a receiving apparatus side.

As shown in FIG. 5A, at step 5110, the receiving apparatus acquires information about IDMA communication between the transmitting apparatus and the receiving apparatus from the transmitting apparatus. At step 5120, the receiving apparatus determines configuration parameters for the transmitting apparatus based on the information about IDMA communication after receipt of the information. For example, configuration parameters including such as operational parameters of interleavers may be determined by a scheduler within the base station while scheduling time-frequency resources for transmission. At step 5130, the receiving apparatus configures the receiving apparatus with the determined configuration parameters. At step 5140, the receiving apparatus transmits the configuration parameters to the transmitting apparatus. The configuration parameter may be carried on the downlink control information of the physical layer, for example, the time-frequency resource allocation information and the configuration parameter are jointly transmitted to the UE through the PDCCH physical downlink control channel in the LTE protocol. The configuration parameters can also be carried on the signaling of the MAC layer, such as the MAC Control Element. The configuration parameters can also be carried on dedicated signaling of a higher layer such as RRC signaling. The three schemes are applicable to scenarios where the reconfiguration period is from short to long. For example, in a system with a fast change in channel conditions, physical layer signaling is used to quickly transmit configuration parameters, and in an application scenario with a slow change in channel conditions, the configuration parameters are transmitted by using RRC signaling with a longer update period. At step 5150, the transmitting apparatus is configured according to the received configuration parameters. At step 5160, the transmitting apparatus transmits data to the receiving apparatus after completing the configuration. At step 5170, the receiving apparatus deinterleaves the data received from the transmitting apparatus.

In the above communication flow, step 5130 may be performed concurrently with one or more of steps 5140, 5150, 5160, or may be performed after one or more of steps 5140, 5150, 5160, as long as step 5130 is completed before the interleaving step 5170.

Figure 5B:
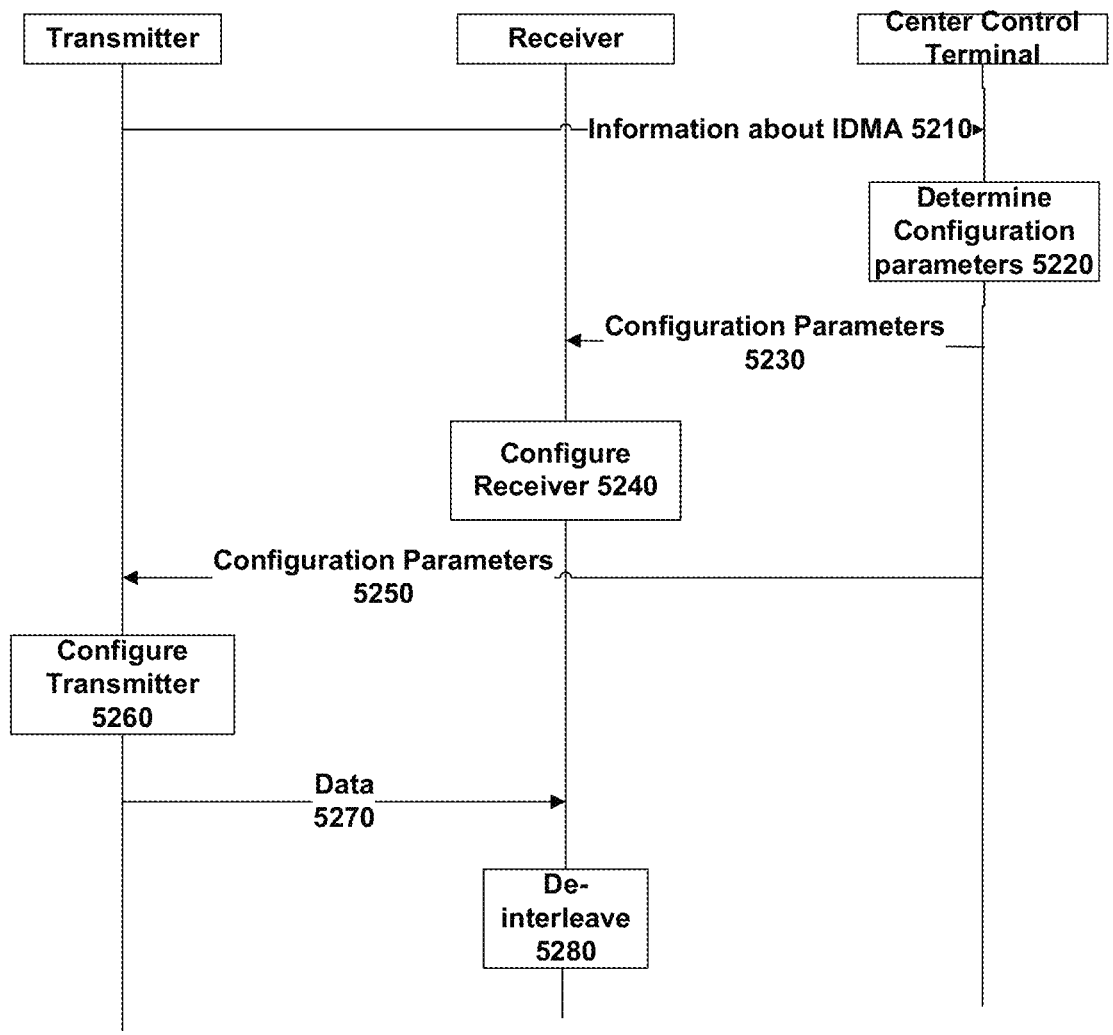
FIG. 5B is a flow chart showing communication of an IDMA system in accordance with an embodiment of the present disclosure.

FIG. 5B is a flowchart showing communication of an IDMA system according to an embodiment of the present disclosure in the case where the electronic device 2000 is an electronic device of a central control terminal.

As shown in FIG. 5B, at step 5210, the central control terminal acquires information about the IDMA communication between the transmitting apparatus and the receiving apparatus from the transmitting apparatus. At step 5220, the central control terminal determines configuration parameters for the transmitting apparatus based on the received information. At step 5230, the central control terminal transmits the determined configuration parameters to the receiving apparatus. At step 5240, the receiving apparatus is configured according to the received configuration parameters. At step 5250, the central control terminal transmits the determined configuration parameters to the transmitting apparatus. At step 5260, the transmitting apparatus is configured according to the received configuration parameters. At step 5270, the transmitting apparatus transmits data to the receiving apparatus after completing the configuration. At step 5280, the receiving apparatus deinterleaves the received data.

In the above communication flow, steps 5230, 5240 may be performed concurrently with one or more of steps 5250, 5260, 5270, or may be performed after one or more of steps 5250, 5260, 5270, as long as steps 5230, 5240 are completed before the de-interlacing step 5280.

FIGS. 5A and 5B are only schematic communication flows. In an actual communication system, there may be other communication steps between the transmitting apparatus, the receiving apparatus and the central control terminal (if any), such as synchronization, signaling exchange, and the like. These communication steps are well known in the art and will not be described in detail herein for the sake of clarity.

Figure 6:
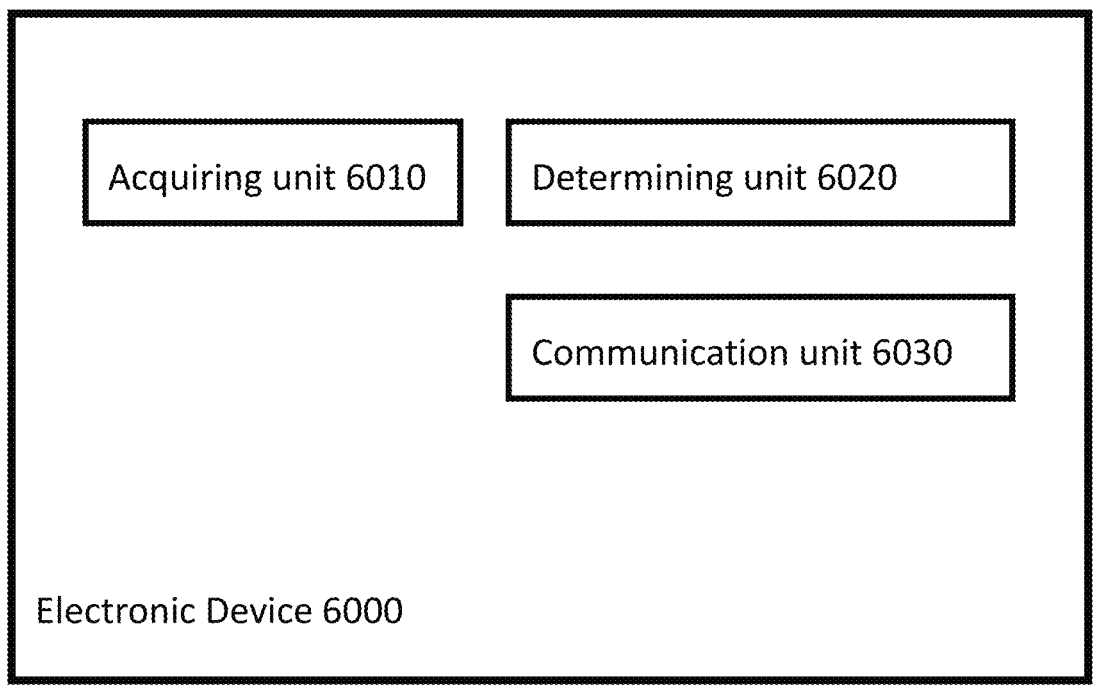
FIG. 6 is a block diagram showing an electronic device in accordance with an embodiment of the present disclosure.

FIG. 6 is a block diagram showing an electronic device 6000 in accordance with one embodiment of the present disclosure. Similar to the electronic device 2000, the electronic device 6000 may be an electronic device at the receiving apparatus side, or may be an electronic device at a central control terminal separate from the receiving apparatus, and may be a complete product or a key component thereof, such as a processing chip.

As shown in FIG. 6, the electronic device 6000 may include an acquiring unit 6010 for performing the step 4010, a determining unit 6020 for performing the step 4020, and a communication unit 6030 for performing the step 4030. These units 6010 to 6030 may be functional modules that implement functions of respective steps, and may be implemented by software or by hardware or firmware.

The electronic device for an interleaved multiple access control terminal and the communication method thereof according to an embodiment of the present disclosure have been described above. By means of the electronic device or the communication method, configuration parameters in the IDMA system, especially operating parameters of interleavers in a transmitting apparatus, can be optimized based on communication characteristics between the transmitting apparatus and a receiving apparatus, thereby improving the performance of the IDMA system.

Although a concept of an IDMA system has been proposed so far, most of the current IDMA systems only belong to a rough concept, and do not involve how to be applied in an actual system, such as how to set configuration parameters for a system according to the system conditions.

Some embodiments of the present invention overcome at least such deficiencies. Some embodiments of the present invention propose an improved technique for applying IDMA technology to an actual communication system, which is capable of setting IDMA-related configuration parameters according to operation conditions of the communication system, thereby supporting an effective signaling interaction process design for the IDMA communication.

Although the concept of random interleaver and the concept of quadrature interleaver have been mentioned so far, the algorithms for these random interleavers do not improve the BER performance of the IDMA system, and the application of the quadrature interleaver is still limited, for example, there still is not given a solution in an environment with large number of users.

Some embodiments of the present application propose an improved technique for optimizing the setting of interleaver operating parameters.

In particular, by performing allocation and setting of hybrid quadrature interleaver and the random interleaver based on information about communication between the transmitting apparatus and the receiving apparatus (e.g., considering communication characteristics of different users), particularly allocating quadrature interleavers for the transmitting apparatus whose channel status meets the predetermined condition, the IDMA system can be enabled to be better suited to an environment with a large number of users, and a good system performance still can be obtained in this environment.

Additionally or alternatively, by optimizing the spreader characteristics according to the communication characteristics between the transmitting apparatus and the receiving apparatus, it is possible to optimize spreading code lengths for different transmitting apparatus while different transmission requirements of the different transmitting apparatus can be satisfied, thereby get the largest possible spreading gain and improve overall system performance.

Accordingly, some embodiments of the present invention improve IDMA system performance, such as reducing BER, overcoming some of the deficiencies of the prior art.

Hereinafter, an electronic device at the receiving apparatus side and an electronic device at the transmitting apparatus side that can communicate with the above-described electronic device will be described.

3. ELECTRONIC DEVICE AT THE RECEIVING DEVICE SIDE

An electronic device at the receiving apparatus side that can communicate with the above electronic device will be described below with reference to FIG. 7.

According to an embodiment of the present disclosure, an electronic device 7000 for an interleaved multiple access receiving apparatus side can comprise a processing circuit 7010. The processing circuit 7010 can be configured to de-interleave data signal from a transmitting apparatus in interleaved multiple access communication with the receiving apparatus based on configuration parameters provided by an interleaved multiple access control terminal. The configuration parameters comprise operation parameters of an interleaver for the transmitting apparatus in interleaved multiple access communication with the receiving apparatus, and the interleaver is used to distinguish the transmitting apparatus from other transmitting apparatus.

The electronic device 7000 may be a base station, a Node B, an e-Node B, or the like in cellular communication, a terminal device in a Machine Type Communication (MTC), a smart meter, or a key component thereof, such as a processing chip therein. (such as an integrated circuit module including a single wafer) other than a complete product.

The processing circuit may select a quadrature user detection circuit for de-interleaving data signal from a transmitting apparatus corresponding to a quadrature interleaver, and select a multiuser detection circuit for de-interleaving data signal from a transmitting apparatus corresponding to a random interleaver or a transmitting apparatus corresponding to hybrid random and quadrature interleavers. The multi-user detection circuit and the quadrature multi-user detection circuit can be as shown in FIGS. 1B and 1C.

In some embodiments, the processing circuit 7010 is further configured to configure corresponding de-interleaver and de-spreader in the quadrature multiuser detection circuit or the multiuser detection circuit based on configuration parameters provided by the interleaved multiple access control terminal.

For example, the electronic device 7000 can configure the type of deinterleaver corresponding to the transmitting apparatus in the receiving apparatus based on the type of interleavers of the transmitting apparatus indicated by the configuration parameter. In some embodiments, the electronic device 7000 generates a deinterleaver in the receiving apparatus by using the interleaver generation algorithm indicated by the configuration parameters. In some embodiments, the electronic device 7000 construct a deinterleaver in the receiving apparatus by using the construction sequence of interleavers indicated by the configuration parameters. In some embodiments, electronic device 7000 configures NIU deinterleavers and despreaders in the receiving apparatus to correspond to the transmitting apparatus based on the number NIU of interleavers indicated by the configuration parameters. In some embodiments, the electronic device 7000 configures the despreader in the receiving apparatus based on the spreading code length S indicated by the configuration parameters.

The deinterleaver and despreader mentioned above may be implemented in the electronic device 7000 or may be an external component controlled by the electronic device 7000.

In some embodiments, the electronic device 7000 can also include a quadrature multi-user detection circuit and a multi-user detection circuit as previously described. The quadrature multi-user detection circuit and the multi-user detection circuit may also be external components controlled by the electronic device 7000.

4. ELECTRONIC DEVICE AT THE TRANSMITTING APPARATUS SIDE

An electronic device at the receiving apparatus side that can communicate with the above electronic device will be described below with reference to FIG. 8.

Figure 8:
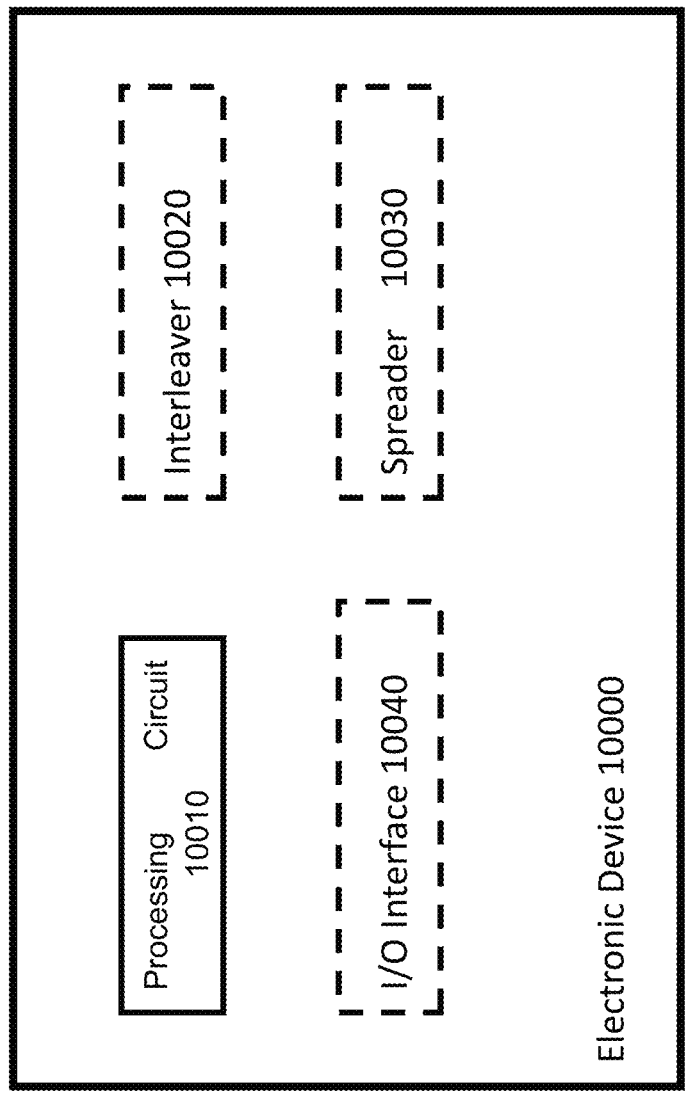
FIG. 8 is a block diagram showing a transmitting apparatus in accordance with an embodiment of the present disclosure.

FIG. 8 illustrates an electronic device 10000 for an interleaved multiple access transmitting apparatus terminal comprising a processing circuit 10010. The processing circuit 10010 is configured to allocate a quadrature interleaver or a random interleaver for the transmitting apparatus in interleaved multiple access communication based on configuration parameters provided by an interleaved multiple access control terminal, wherein the quadrature interleaver or random interleaver is used to, when the transmitting apparatus is in interleaved multiple access communication with a receiving apparatus, distinguish the transmitting apparatus from other transmitting apparatus.

The configuration parameters, the identification information of the interleaver, the quadrature interleaver, and the random interleaver have been described in detail when the electronic device 2000 for an interleaved multiple access control terminal is described hereinbefore, and thus will be not described herein for avoiding repetition.

In some embodiments, the processing circuit 10010 is configured to, when channel status or data transmission requirement between the transmitting apparatus and the receiving apparatus meets with corresponding predetermined condition, allocate a quadrature interleaver for the transmitting apparatus based on configuration parameters provided by the interleaved multiple access control terminal. Here, the channel status may include one or more of channel quality and channel direction. For example, the configuration of the quadrature interleaver can be implemented as described above, and the description will not be repeated here.

The processing circuit 10010 can be configured to generate the quadrature interleaver based on a walsh sequence or an m-sequence. The generation algorithm for the walsh sequence-based quadrature interleaver and the m sequence-based quadrature interleaver have been described above.

In some embodiments, the electronic device 10000 constructs the interleaver in the transmitting apparatus by using construction sequences of interleaver indicated by the configuration parameters. In some embodiments, the electronic device 10000 configures NIU interleavers and spreaders in the transmitting apparatus to correspond to the receiving apparatus based on the number NIU of interleavers indicated by the configuration parameters. In some embodiments, the electronic device 10000 configures spreaders in the receiving apparatus based on the spreading code length S indicated by the configuration parameters.

The interleaver and the spreader mentioned above may be implemented in the electronic device 10000 or may be an external component controlled by the electronic device 10000. For example, electronic device 10000 can also include an interleaver 10020 and a spreader 10030. Further, the electronic device 10000 may further include an I/O interface 10040 for transmitting signals to and receiving signals from an external device.

In one embodiment, the amount Q of the data to be transmitted by the transmitting apparatus may change with time, so it may happen that Q is much smaller than the longest transmission data length that can be provided by the allocated multiple interleavers, that is, $Q<<NIU*P*D$, where NIU is the number of interleavers used by the transmitting apparatus, P is the number of data blocks independently decoded in a scheduling period, and D is the transmission data length of an interleaver. The relationship between D and the interleaver depth L and the spreading code length S described above is: $L=D*S$. Especially for a case where the scheduling period is long, there will be several interleavers in an idle state in one scheduling period, and these interleavers do not send information. In order to save resources and improve the accuracy of multi-user detection, the transmitting apparatus may report information NII about interleavers in an idle state to the receiving apparatus.

The transmitting apparatus can generate and deliver NII information by adding redundant bits. For example, according to the number $NIU_k$ of interleaver and the spreading code length S information allocated for the transmitting apparatus k, the transmitting apparatus can calculate the remaining data length $LQ_k(j)$ in the upstream buffer after the jth data transmission, according to the following equation (8):

$$LQ_k(j)=Q_k-j*NIU_k*D, 0\leq j\leq P-1 \quad (8)$$

Where $Q_k$ is the remaining data length in the upstream data buffer for the transmitting apparatus k. If $LQ_k(j)> NIU_k*D$, the last bit of the $j^{th}$ transmission data of each interleaver is set to 1, indicating that the corresponding interleaver still needs to transmit data at the $j+1^{th}$ time; if $0\leq LQ_k(j)\leq NIU_k*D$, then the number $NII_k(j+1)$ of idle interleavers in the $j+1^{th}$ data transmission is obtained by the following equation (9):

$$NII_k(j+1) = \left\lfloor \frac{NIU_k*D-LQ_k(j)}{D} \right\rfloor = \lfloor NIU_k - Q_k(j)/D \rfloor \quad (9)$$

The last bit of the $j^{th}$ transmission data of the $NII_k$ interleaver is set to 0, indicating that the corresponding interleaver is idle in the $j+1^{th}$ time, no data is transmitted, and the last bit of $j^{th}$ transmitted data of the remaining interleavers is 1; if $LQ_k(j)<0$, a process according to $LQ_k(j)=0$ is performed by default.

The transmitting apparatus can also generate and transmit NII information by adding signaling. In this case, the manner in which $NII_k$ is generated is identical with the above method. The difference is that when $NII_k(j+1)$ is not 0, the value of j and the value of $NII_k(j+1)$ are combined as a NII signaling to be reported to the receiving apparatus.

Correspondingly, the receiving apparatus deletes the corresponding interleaver from the multi-user detection process according to the NII information when the data of the transmitting apparatus is recovered, so as to avoid interference of signals in the idle interleaver on data in other interleavers.

Further, an electronic device for a transmitting apparatus side according to an embodiment of the present disclosure may also be configured as follows.

An electronic device for interleaving multiple access transmitting apparatus side comprises a processing circuit configured to: transmit, to an interleaved multiple access control terminal, information about interleaved multiple access communication between a receiving apparatus and the transmitting apparatus; acquire, from the multiple access control terminal, configuration parameters for the transmitting apparatus determined based on the information, the configuration parameters comprising operation parameters of an interleaver of the transmitting apparatus, the interleaver being used to distinguish the transmitting apparatus from other transmitting apparatus; and configure the transmitting apparatus according to the configuration parameters.

In some embodiments, the information comprises information indicating channel status of communication between the transmitting apparatus and the receiving apparatus.

In some embodiments, the information includes data transmission requirement information about data transmission between the transmitting apparatus and the receiving apparatus, the data transmission requirement information indicating one or more of data amount and required data transmission velocity of data to be transmitted by the transmitting apparatus.

In some embodiments, the information comprises number of available interleaver information of the transmitting apparatus, the number of available interleaver information indicating number of interleavers available for the transmitting apparatus.

In some embodiments, the operation parameters of the interleaver comprise identification information characterizing the interleaver.

In some embodiments, the identification information of the interleaver indicates the type of interleaver configured for the transmitting apparatus, and wherein the type of interleaver comprises quadrature interleaver and random interleaver.

In some embodiments, the identification information of the interleaver indicates algorithms for generating the interleaver, comprising one or more of: algorithm for generating quadrature interleaver based on Walsh sequence; algorithm for generating quadrature interleaver based on M sequence; algorithm for generating random interleaver based on tree-structure; and algorithm for generating random interleaver based on prime number-structure.

In some embodiments, the identification information of the interleaver corresponds to a construction sequence of the interleaver.

In some embodiments, when the receiving apparatus is in interleaved multiple access communication with a plurality of transmitting apparatus, a transmitting apparatus, the channel status between which and the receiving apparatus meets with a predetermined condition, is allocated a quadrature interleaver priorly.

In some embodiments, when quadrature interleavers have been allocated, random interleavers are allocated to remaining transmitting apparatus.

In some embodiments, the configuration parameters further comprise spread code length information indicating a spread code length of a spreader of the transmitting apparatus, and the processing circuit is configured to determine the spread code length based on the data transmission requirement information In some embodiments, when the receiving apparatus is in interleaved multiple access communication with a plurality of transmitting apparatus, spread code lengths for the plurality of transmitting apparatus are determined separately, and the minimum among the determined spread code lengths is taken as a common spread code length for the plurality of transmitting apparatus.

In some embodiments, the configuration parameters further comprise information indicating number of interleavers used by the transmitting apparatus, and the number of interleavers is determined based on the requirement of data transmission between the receiving apparatus and the transmitting apparatus and the number of interleavers available for the transmitting apparatus.

In some embodiments, when the receiving apparatus is in interleaved multiple access communication with a plurality of transmitting apparatus, the same time-frequency resource is allocated for the plurality of transmitting apparatus for the interleaved multiple access communication between the receiving apparatus and the plurality of transmitting apparatus.

In some embodiments, the electronic device further comprises a storage device which is configured to store information about interleaved multiple access communication between the receiving apparatus and the transmitting apparatus and configuration parameters for the transmitting apparatus.

5. SIMULATION RESULTS

In order to more clearly and intuitively demonstrate the beneficial effects achieved by the technical solution of the present application, simulation results of the electronic device and method of the present application are demonstrated below.

Considering a cell model in which 40 transmitting apparatus are evenly distributed in a circle centered on the receiving apparatus, and a transmitting apparatus near the receiving apparatus has better channel conditions, the channel coefficient being 2.236; and a transmitting apparatus far from the receiving apparatus has poor channel conditions, the channel coefficient being 1. Where 20 transmitting apparatus each is only equipped with one interleaver, which is recorded as a transmitting apparatus type 1; 20 transmitting apparatus each is configured with 2 interleavers, which are recorded as a transmitting apparatus type 2. So the total number of interleavers is 60. The cell model is shown in FIG. 9.

Figures 9, 10:
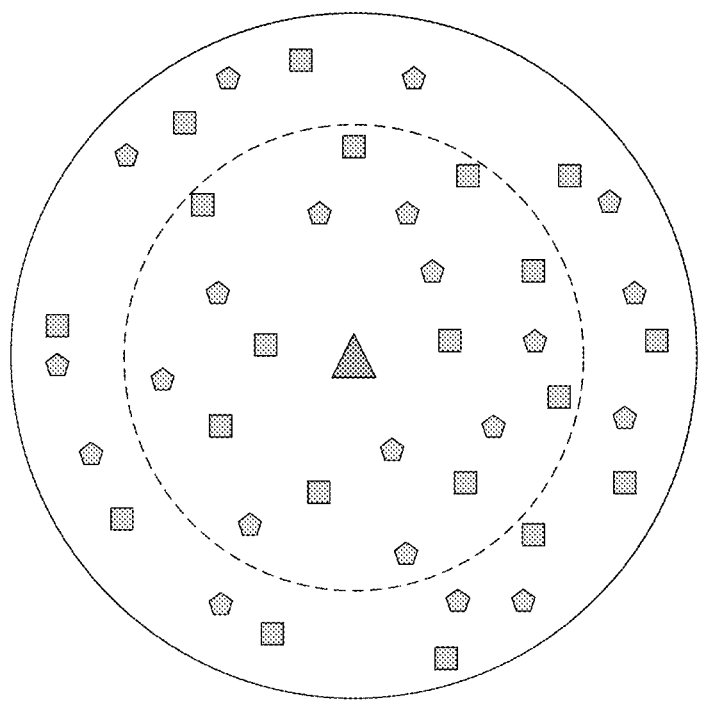
FIG. 9 is a schematic diagram showing a cell model according to an embodiment of the present disclosure.
FIG. 10 is a diagram showing parameters for simulation according to an embodiment of the present disclosure.

In FIG. 9, the triangle represents the receiving apparatus, the rectangle represents the transmitting apparatus type 1, and the pentagon represents the transmitting apparatus type 2. The channel coefficient of the transmitting apparatus outside the dotted line is 1, and the channel coefficient of the transmitting apparatus within the dotted line is 2.236.

It is assumed that the data length D to be transmitted by each interleaver is 60 bits, and the spreading length S is 32. Since $NIU_{sum}>S-1$, a state in which 31 quadrature interleavers and 29 random interleavers are mixed will be used.

In order to evaluate the allocation method of quadrature interleavers proposed in the present disclosure, we make the following comparative experiments. An IDMA system using only random interleavers is referred to as IDMA 1; an IDMA system in which quadrature interleavers and random interleavers are used for hybrid transmission, but the quadrature interleavers are evenly allocated to the UE is referred to as IDMA 2; an IDMA system in which quadrature interleavers and random interleavers are used for hybrid transmission and quadrature interleavers are first allocated to UEs with good channel status is referred to as IDMA 3. The parameters for the transmitting apparatus are shown in FIG. 10, where H represents the channel coefficient. Here, that the quadrature interleavers are evenly distributed means that the quadrature interleavers are randomly allocated regardless of channel conditions.

The number of iterations of multi-user detection is 5, and the number of simulations is 1000. The simulation uses AWGN channel and BPSK modulation, and the result is the BER mean value of 60 IDMA units. Comparing the BER performance differences among IDMA 1, IDMA 2 and IDMA 3, the simulation results are shown in FIG. 11.

Figures 11, 12:
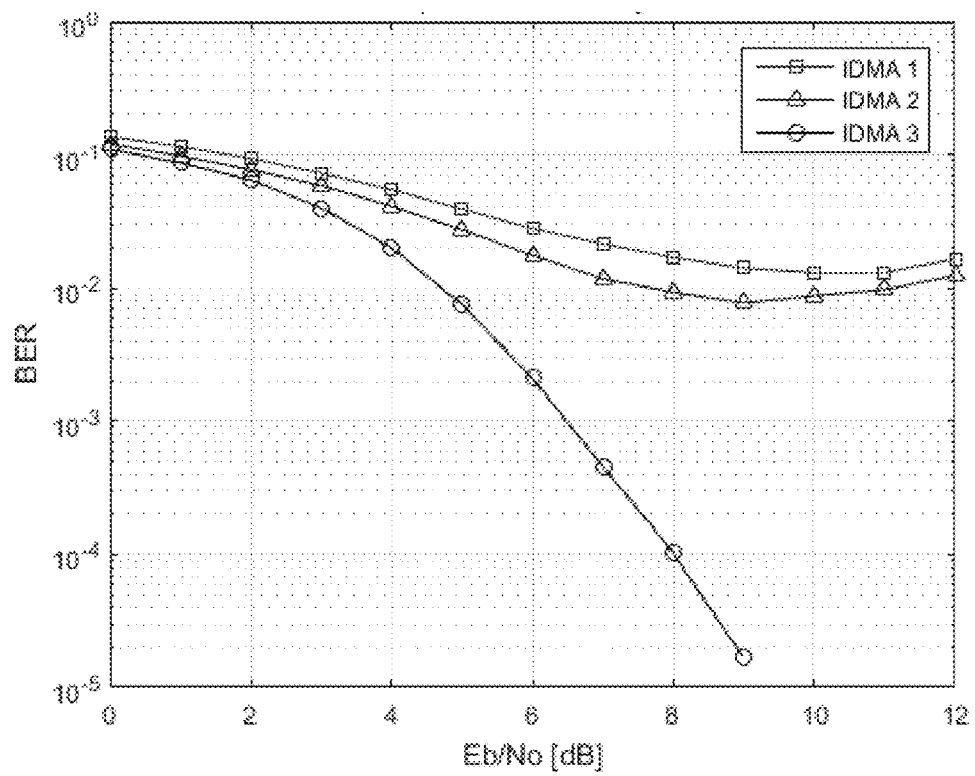
FIG. 11 is a graph showing simulation results according to an embodiment of the present disclosure.
FIG. 12 is a graph showing simulation results according to an embodiment of the present disclosure.

As can be seen from FIG. 11, the performance of the system using mixed quadrature interleavers and random interleavers is better than that of the system using random interleavers alone. It can also be seen that allocation of quadrature interleavers as interleavers for the transmitting apparatus with good channel conditions can bring greater performance gain, compared with the method of even allocation. It should be understood that an even allocation method may also be included in the solution of the present invention, and other allocation methods are also included in the method of the present invention as long as quadrature interleavers and random interleavers can be allocated mixedly based on information about communication between the transmitting apparatus and the receiving apparatus.

In order to more clearly see the effect of the quadrature interleaver allocation on the iterative complexity of the IDMA system, we counted the number of iterations required for reducing the BER to $10^{-4}$ and less in IDMA 1, IDMA 2 and IDMA 3 for different Eb/N0, as shown in FIG. 12.

By comparison, IDMA3 can reduce the iteration complexity of the receiving side to a large extent compared with IDMA1 and IDMA2, thereby reducing system delay and improving overall system performance.

6. APPLICATION EXAMPLES

The technique of the present disclosure can be applied to various products. For example, the electronic device for the central control terminal according to an embodiment of the present disclosure may be implemented as any type of server, such as a tower server, a rack server, and a blade server. The central control terminal can be a control module mounted on the server (such as an integrated circuit module including a single wafer, and a card or blade inserted into a slot of the blade server).

For example, the electronic device for the receiving apparatus side according to an embodiment of the present disclosure may be implemented as any type of evolved Node B (eNB), such as a macro eNB and a small eNB. A small eNB may be an eNB that covers cells smaller than the macro cells, such as a pico eNB, a micro eNB, or a home (femto) eNB. Alternatively, the the electronic device for the receiving apparatus side may be implemented as any other type of BS, such as a NodeB and a Base Transceiver Station (BTS). The BS may comprise: a main unit that is configured to control wireless communication, also referred to as a BS device; and one or more remote wireless headends (RRHs) that are located in different locations from the main unit. In addition, various types of terminals described below may operate as an electronic device for the receiving apparatus side by temporarily or semi-permanently performing the functions of a BS.

For example, the electronic device for the transmitting apparatus side according to an embodiment of the present disclosure may be implemented as a mobile side such as a smart phone, a tablet personal computer (PC), a notebook PC, a portable game side, a portable/dongle type mobile router, and a digital camera, or an on-board side such as a car navigation device. The electronic device for the receiving apparatus side may also be implemented as a terminal performing machine-to-machine (M2M) communication, also referred to as a machine type communication (MTC) terminal. In addition, the electronic device for the transmitting apparatus side may be a wireless communication module installed on each of the aforementioned terminals, such as an integrated circuit module including a single wafe.

Figure 13:
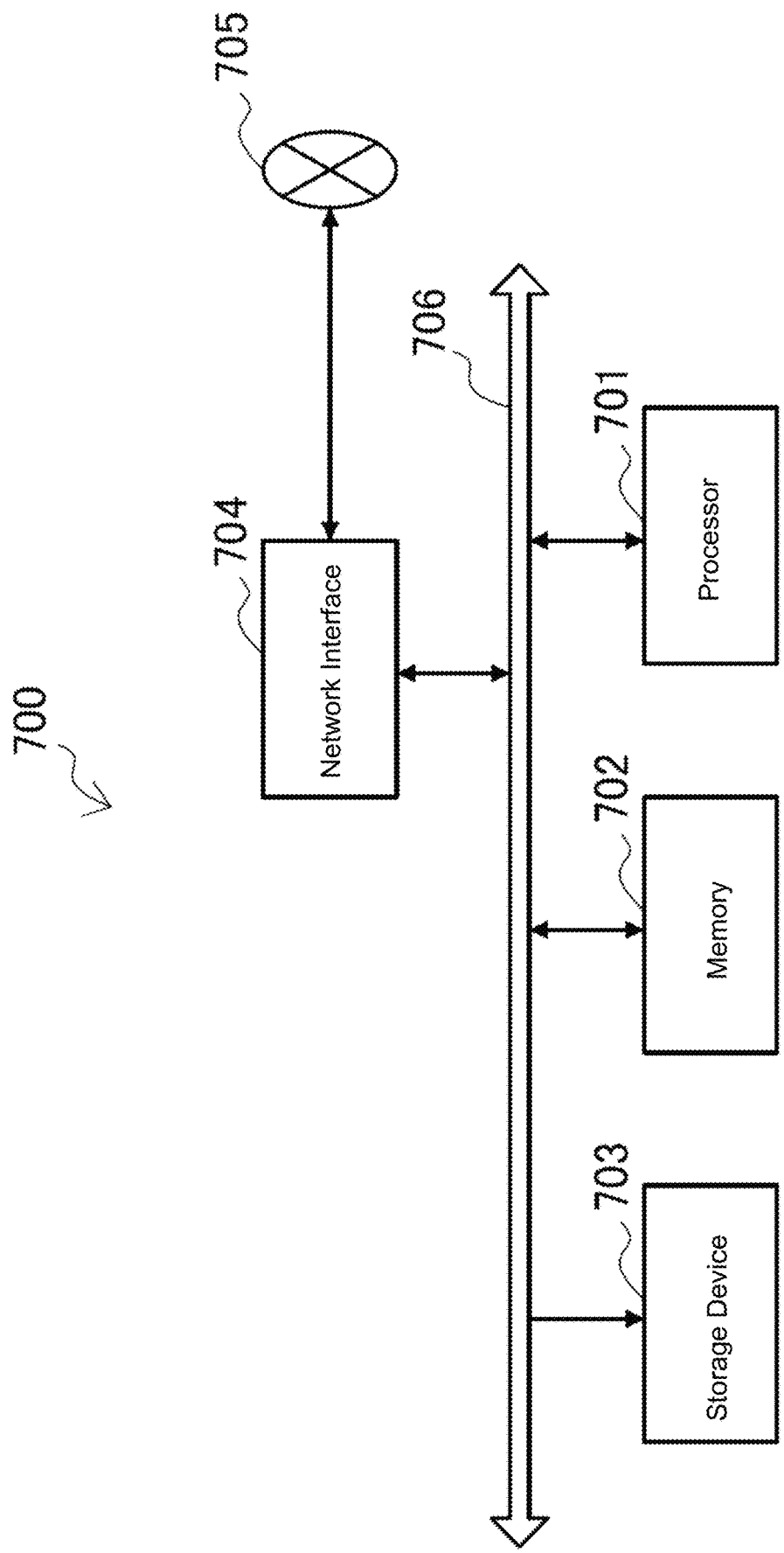
FIG. 13 is a block diagram showing an example of a schematic configuration of a server.

6-1. Application Example of Electronic Device for the Central Control Terminal FIG. 13 is a block diagram showing an example of a schematic configuration of a server 700 to which the technique of the present disclosure can be applied. Server 700 includes a processor 701, a memory 702, a storage device 703, a network interface 704, and a bus 706.

The processor 701 can be, for example, a central processing unit (CPU) or a digital signal processor (DSP) and controls the functionality of the server 700. The memory 702 includes random access memory (RAM) and read only memory (ROM), and stores data and programs executed by the processor 701. The storage device 703 may include a storage medium such as a semiconductor memory and a hard disk.

Network interface 704 is a wired communication interface for connecting server 700 to a wired communication network 705. The wired communication network 705 can be a core network such as an Evolved Packet Core Network (EPC) or a packet data network (PDN) such as the Internet.

The bus 706 connects the processor 701, the memory 702, the storage device 703, and the network interface 704 to each other. Bus 706 can include two or more buses each having a different speed, such as a high speed bus and a low speed bus.

In the server 700 shown in FIG. 13, the processing circuit 2010 described by using FIG. 2, the acquiring unit 6010, the determining unit 6020, and the communication unit 6030 described by using FIG. 6 can be implemented by the processor 701. For example, the processor 701 can implement the above components by executing programs stored in the memory 702 and the storage device 703.

6-2. Application Example of Base Station

First Application Example

Figure 14:
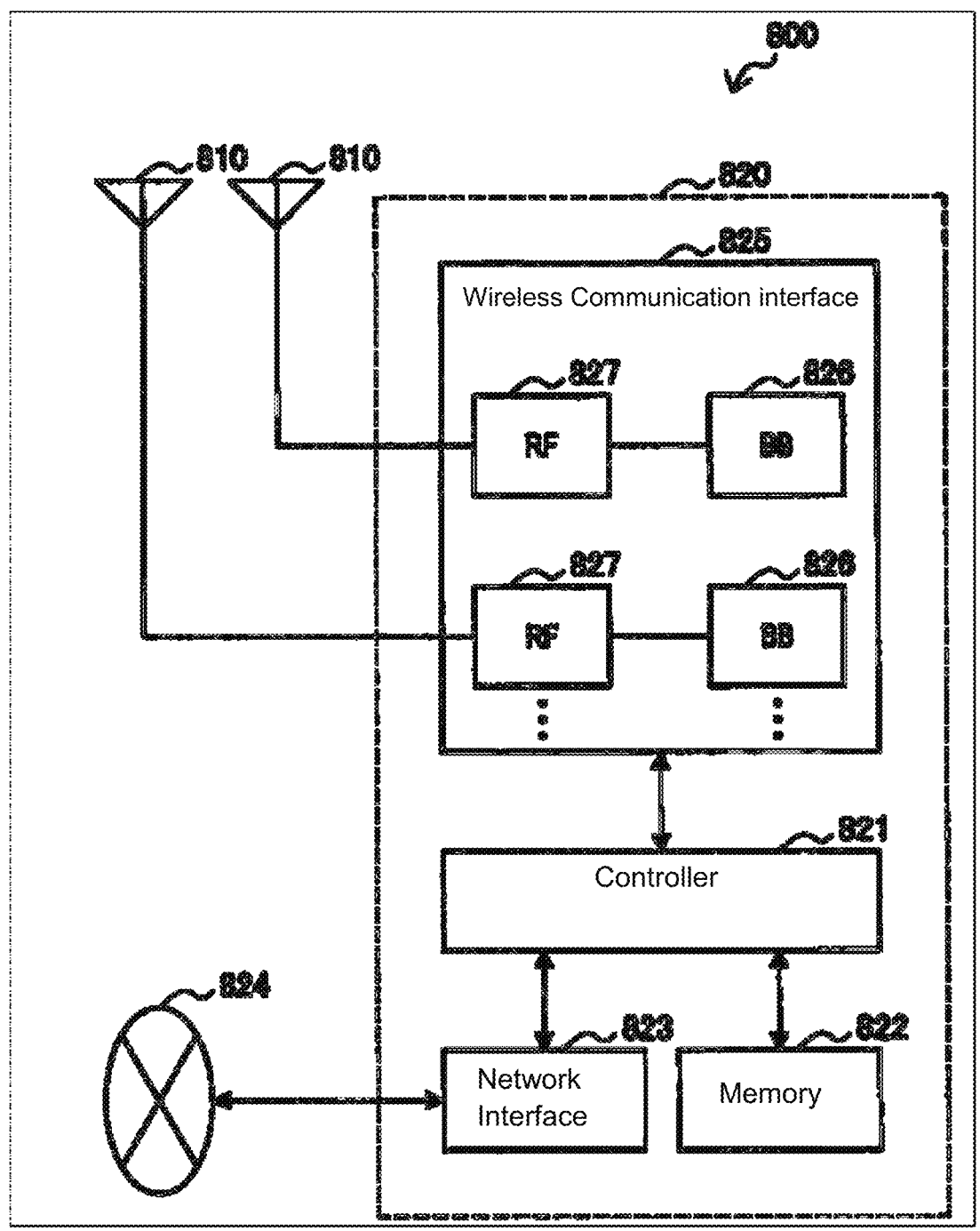
FIG. 14 is a block diagram showing a first example of a schematic configuration of an eNB.

FIG. 14 is a block diagram showing a first example of a schematic configuration of an eNB to which the technique of the present disclosure may be applied. The eNB 800 includes one or more antennas 810 and a base station device 820. The base station device 820 and each antenna 810 may be connected to each other via RF cables.

Each of the antennas 810 includes a single antenna element or multiple antenna elements, such as multiple antenna elements included in a multiple input multiple output (MIMO) antenna, and is used by the base station apparatus 820 to transmit and receive wireless signals. As shown in FIG. 14, the eNB 800 can include multiple antennas 810. For example, multiple antennas 810 can be compatible with multiple frequency bands used by eNB 800. Although FIG. 14 shows an example in which the eNB 800 includes multiple antennas 810, the eNB 800 may also include a single antenna 810.

The base station device 820 includes a controller 821, a memory 822, a network interface 823, and a wireless communication interface 825.

The controller 821 can be, for example, a CPU or a DSP, and operates various functions of higher layers of the base station device 820. For example, controller 821 generates data packets based on data in signals processed by wireless communication interface 825 and passes the generated packets via network interface 823. Controller 821 can bundle data from multiple baseband processors to generate bundled packets and pass the generated bundled packets. The controller 821 can have logic functions that perform control such as radio resource control, radio bearer control, mobility management, admission control, and scheduling. This control can be performed in conjunction with nearby eNBs or core network nodes. The memory 822 includes a RAM and a ROM, and stores programs executed by the controller 821 and various types of control data such as a side list, transmission power data, and scheduling data.

Network interface 823 is a communication interface for connecting base station device 820 to core network 824. Controller 821 can communicate with a core network node or another eNB via network interface 823. In this case, the eNB 800 and the core network node or other eNBs may be connected to each other through a logical interface such as an S1 interface and an X2 interface. Network interface 823 can also be a wired communication interface or a wireless communication interface for wireless backhaul lines. If network interface 823 is a wireless communication interface, network interface 823 can use a higher frequency band for wireless communication than the frequency band used by wireless communication interface 825.

The wireless communication interface 825 supports any cellular communication scheme, such as Long Term Evolution (LTE) and LTE-Advanced, and provides a wireless connection to terminals located in cells of the eNB 800 via the antenna 810. Wireless communication interface 825 may typically include, for example, a baseband (BB) processor 826 and RF circuitry 827. The BB processor 826 can perform, for example, encoding/decoding, modulation/demodulation, and multiplexing/demultiplexing, and performs various types of signal processing in layers (eg, L1, Medium Access Control (MAC), Radio Link Control (RLC), and Packet Data Convergence Protocol (PDCP)). Instead of controller 821, BB processor 826 may have some or all of the logic functions described above. The BB processor 826 can be a memory that stores communication control programs, or a module that includes a processor and associated circuitry configured to execute the programs. The update program can cause the function of the BB processor 826 to change. The module can be a card or blade that is inserted into a slot of the base station device 820. Alternatively, the module can also be a chip mounted on a card or blade. Meanwhile, the RF circuit 827 may include, for example, a mixer, a filter, and an amplifier, and transmits and receives a wireless signal via the antenna 810.

As shown in FIG. 14, the wireless communication interface 825 can include a plurality of BB processors 826. For example, multiple BB processors 826 can be compatible with multiple frequency bands used by eNB 800. As shown in FIG. 14, the wireless communication interface 825 can include a plurality of RF circuits 827. For example, multiple RF circuits 827 can be compatible with multiple antenna elements. Although FIG. 14 illustrates an example in which the wireless communication interface 825 includes a plurality of BB processors 826 and a plurality of RF circuits 827, the wireless communication interface 825 may also include a single BB processor 826 or a single RF circuit 827.

Second Application Example

Figure 15:
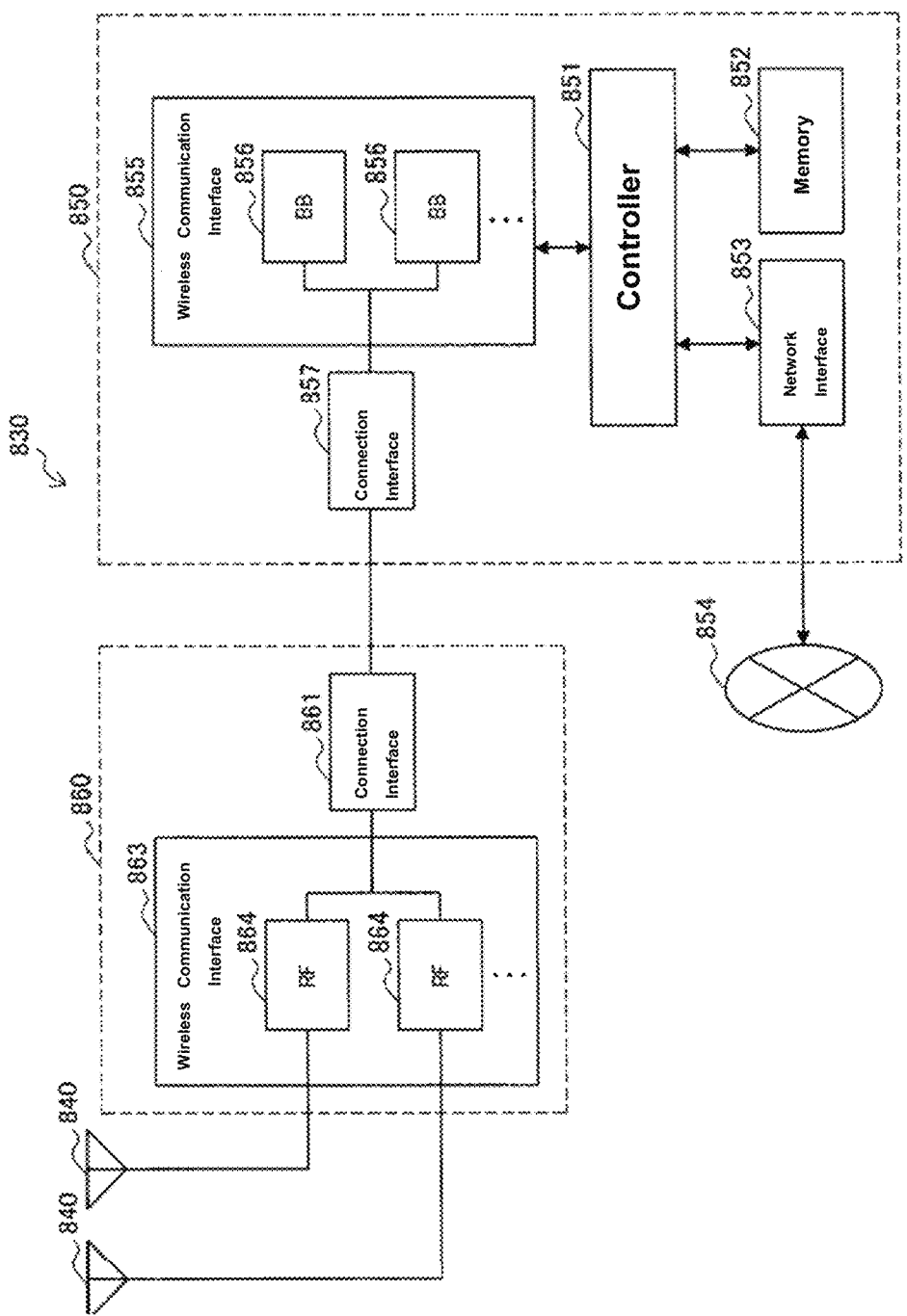
FIG. 15 is a block diagram showing a second example of a schematic configuration of an eNB.

FIG. 15 is a block diagram showing a second example of a schematic configuration of an eNB to which the technique of the present disclosure may be applied. The eNB 830 includes one or more antennas 840, a base station device 850, and an RRH 860. The RRH 860 and each antenna 840 may be connected to each other via an RF cable. The base station device 850 and the RRH 860 can be connected to each other via a high speed line such as a fiber optic cable.

Each of the antennas 840 includes a single antenna element or multiple antenna elements (such as multiple antenna elements included in a MIMO antenna) and is used by the RRH 860 to transmit and receive wireless signals. As shown in FIG. 15, eNB 830 can include multiple antennas 840. For example, multiple antennas 840 may be compatible with multiple frequency bands used by eNB 830. Although FIG. 15 illustrates an example in which the eNB 830 includes multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 14.

The wireless communication interface 855 supports any cellular communication scheme (such as LTE and LTE-Advanced) and provides wireless communication to terminals located in sectors corresponding to the RRH 860 via the RRH 860 and the antenna 840. Wireless communication interface 855 can generally include, for example, BB processor 856. The BB processor 856 is identical to the BB processor 826 described with reference to FIG. 14 except that the BB processor 856 is connected to the RF circuit 864 of the RRH 860 via the connection interface 857. As shown in FIG. 15, wireless communication interface 855 can include a plurality of BB processors 856. For example, multiple BB processors 856 can be compatible with multiple frequency bands used by eNB 830. Although FIG. 15 illustrates an example in which the wireless communication interface 855 includes a plurality of BB processors 856, the wireless communication interface 855 can also include a single BB processor 856.

The connection interface 857 is an interface for connecting the base station device 850 (wireless communication interface 855) to the RRH 860. The connection interface 857 may also be a communication module for communicating the base station device 850 (wireless communication interface 855) to the above-described high speed line of the RRH 860.

The RRH 860 includes a connection interface 861 and a wireless communication interface 863.

The connection interface 861 is an interface for connecting the RRH 860 (wireless communication interface 863) to the base station device 850. The connection interface 861 can also be a communication module for communication in the above high speed line.

The wireless communication interface 863 transmits and receives wireless signals via the antenna 840. Wireless communication interface 863 can typically include, for example, RF circuitry 864. The RF circuit 864 can include, for example, a mixer, a filter, and an amplifier, and transmits and receives wireless signals via the antenna 840. As shown in FIG. 15, the wireless communication interface 863 can include a plurality of RF circuits 864. For example, multiple RF circuits 864 can support multiple antenna elements. Although FIG. 15 shows an example in which the wireless communication interface 863 includes a plurality of RF circuits 864, the wireless communication interface 863 may also include a single RF circuit 864.

Figure 7:
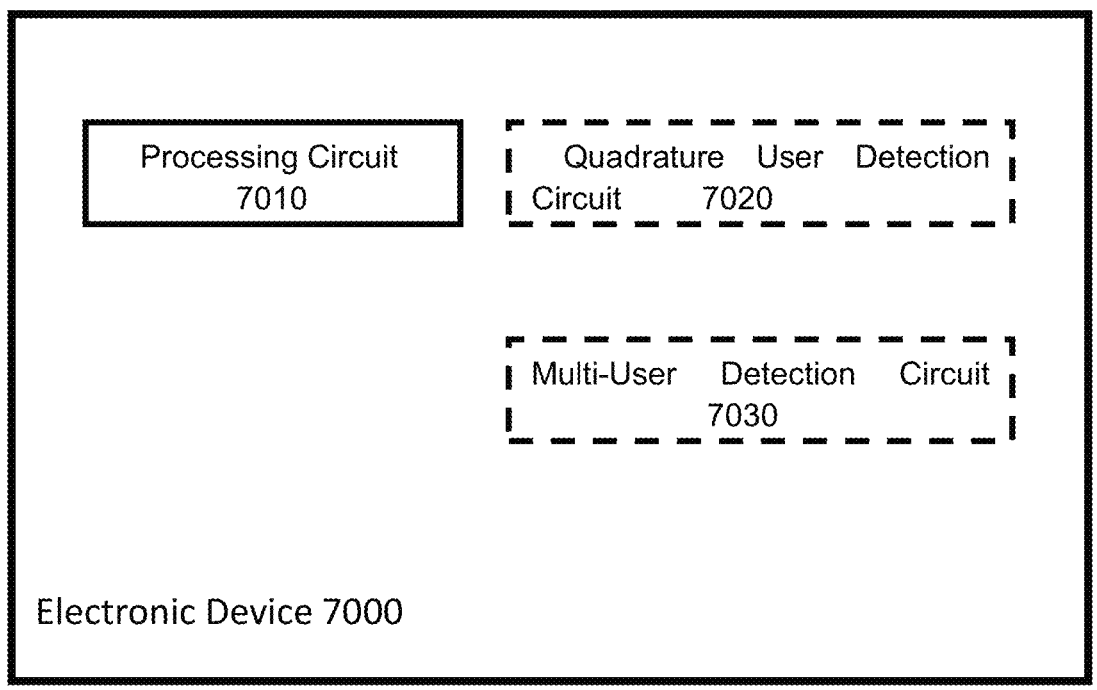
FIG. 7 is a block diagram showing a receiving apparatus according to an embodiment of the present disclosure.

In the eNB 800 and the eNB 830 shown in FIGS. 14 and 15, the processing circuit 2010 described by using FIG. 2, the acquiring unit 6010, the determining unit 6020, and the communication unit 6030 described by using FIG. 6, the processing circuit 7010, the quadrature multi-user detection circuit 7020 and the multi-user detection circuit 7030 described by using FIG. 7 may be implemented by the controller 821 and the controller 851, or may be implemented by the wireless communication interface 825 and the wireless communication interface 855 and/or the wireless communication interface 863.

6-3. Example of Application about the Terminal Device

First Application Example

Figure 16:
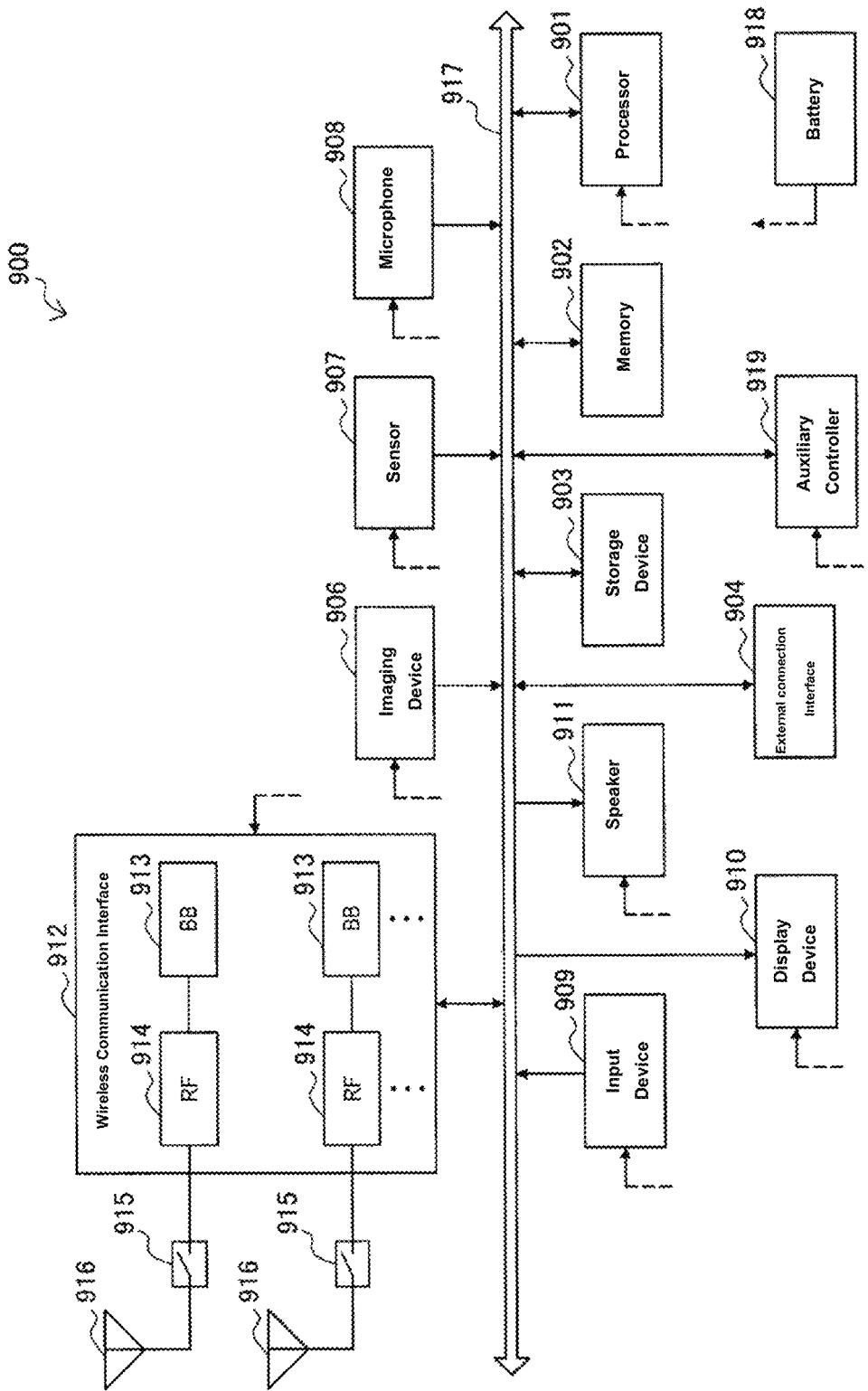
FIG. 16 is a block diagram showing an example of a schematic configuration of a smartphone.

FIG. 16 is a block diagram showing an example of a schematic configuration of a smartphone 900 to which the technique of the present disclosure can be applied. The smart phone 900 includes a processor 901, a memory 902, a storage device 903, an external connection interface 904, an imaging device 906, a sensor 907, a microphone 908, an input device 909, a display device 910, a speaker 911, a wireless communication interface 912, one or more antenna switch 915, one or more antennas 916, a bus 917, a battery 918, and an auxiliary controller 919.

The processor 901 can be, for example, a CPU or a system on chip (SoC), and controls the functions of the application layer and other layers of the smart phone 900. The memory 902 includes a RAM and a ROM, and stores data and programs executed by the processor 901. The storage device 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. Sensor 907 can include a set of sensors, such as measurement sensors, gyro sensors, geomagnetic sensors, and acceleration sensors. The microphone 908 converts the sound input to the smartphone 900 into an audio signal. The input device 909 includes, for example, a touch sensor, a keypad, a keyboard, a button, or a switch configured to detect a touch on the screen of the display device 910, and receives an operation or information input from a user. The display device 910 includes screens such as a liquid crystal display (LCD) and an organic light emitting diode (OLED) display, and displays an output image of the smartphone 900. The speaker 911 converts the audio signal output from the smartphone 900 into sound.

The wireless communication interface 912 supports any cellular communication scheme (such as LTE and LTE-Advanced) and performs wireless communication. Wireless communication interface 912 may generally include, for example, BB processor 913 and RF circuitry 914. The BB processor 913 can perform, for example, encoding/decoding, modulation/demodulation, and multiplexing/demultiplexing, and performs various types of signal processing for wireless communication. At the same time, RF circuitry 914 may include, for example, mixers, filters, and amplifiers, and transmit and receive wireless signals via antenna 916. The wireless communication interface 912 can be a chip module on which the BB processor 913 and the RF circuit 914 are integrated. As shown in FIG. 16, the wireless communication interface 912 can include a plurality of BB processors 913 and a plurality of RF circuits 914. Although FIG. 16 illustrates an example in which the wireless communication interface 912 includes a plurality of BB processors 913 and a plurality of RF circuits 914, the wireless communication interface 912 may also include a single BB processor 913 or a single RF circuit 914.

Moreover, in addition to cellular communication schemes, wireless communication interface 912 can support additional types of wireless communication schemes, such as short-range wireless communication schemes, near field communication schemes, and wireless local area network (LAN) schemes. In this case, the wireless communication interface 912 can include a BB processor 913 and RF circuitry 914 for each wireless communication scheme.

Each of the antenna switches 915 switches the connection destination of the antenna 916 between a plurality of circuits included in the wireless communication interface 912, such as circuits for different wireless communication schemes.

Each of the antennas 916 includes a single antenna element or multiple antenna elements (such as multiple antenna elements included in a MIMO antenna) and is used by the wireless communication interface 912 to transmit and receive wireless signals. As shown in FIG. 16, smart phone 900 can include multiple antennas 916. Although FIG. 16 shows an example in which the smartphone 900 includes a plurality of antennas 916, the smartphone 900 may also include a single antenna 916.

Additionally, smart phone 900 can include an antenna 916 for each wireless communication scheme. In this case, the antenna switch 915 can be omitted from the configuration of the smartphone 900.

The bus 917 sets the processor 901, the memory 902, the storage device 903, the external connection interface 904, the camera 906, the sensor 907, the microphone 908, the input device 909, the display device 910, the speaker 911, the wireless communication interface 912, and the auxiliary controller 919 to each other. connection. Battery 918 provides power to various blocks of smart phone 900 shown in FIG. 16 via feeders, which are partially shown as dashed lines in the figure. The auxiliary controller 919 operates the minimum necessary function of the smartphone 900, for example, in a sleep mode.

In the smart phone 900 shown in FIG. 16, the processing circuit 10010, the interleaver 10020, and the spreader 10030 described by using FIG. 8 can be implemented by the wireless communication interface 912, or can be implemented by the processor 901 or the auxiliary controller 919.

Second Application Example

Figure 17:
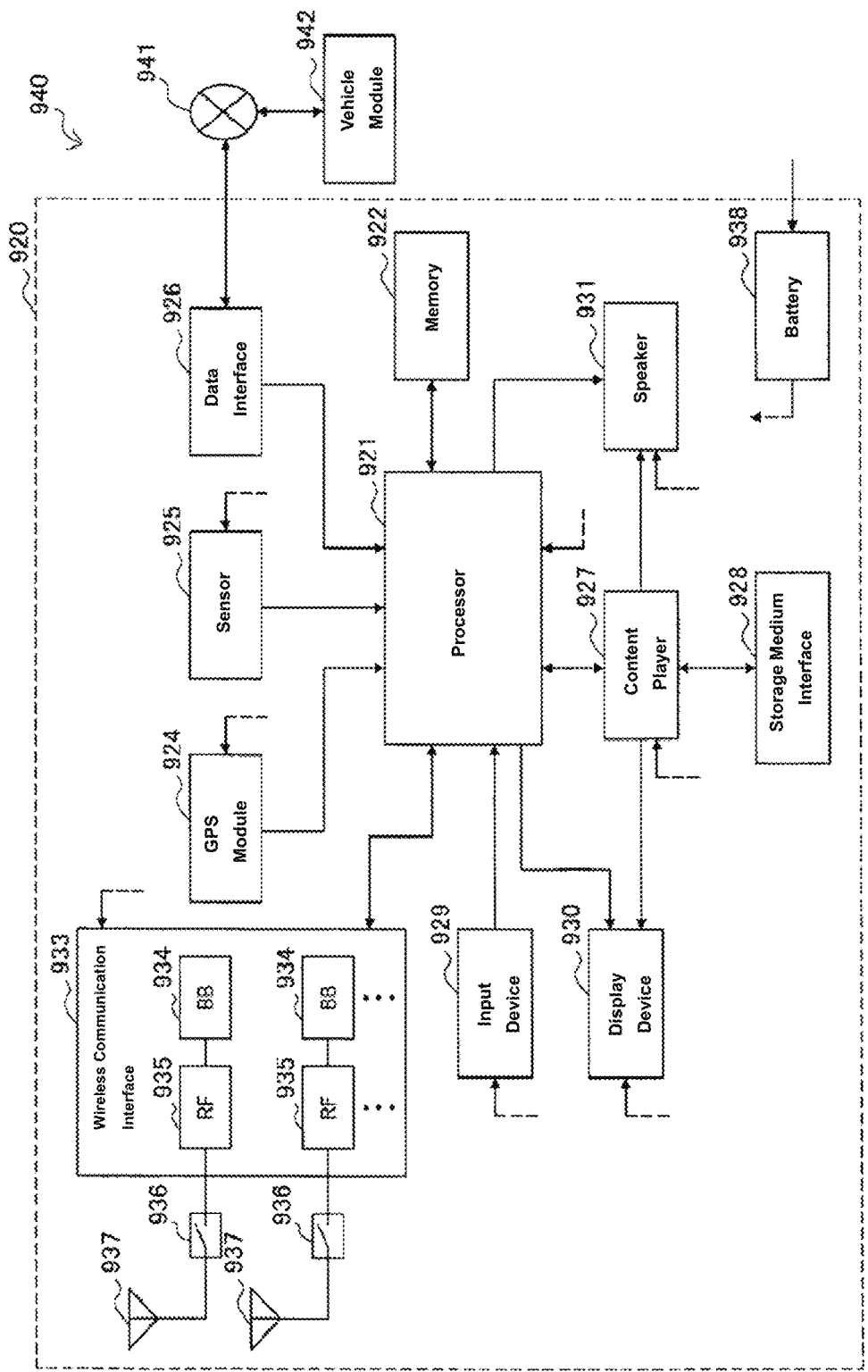
FIG. 17 is a block diagram showing an example of a schematic configuration of a car navigation device.

FIG. 17 is a block diagram showing an example of a schematic configuration of a car navigation device 920 to which the technique of the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, and a wireless device, communication interface 933, one or more antenna switches 936, one or more antennas 937, and battery 938.

The processor 921 can be, for example, a CPU or a SoC, and controls navigation functions and additional functions of the car navigation device 920. The memory 922 includes RAM and ROM, and stores data and programs executed by the processor 921.

The GPS module 924 measures the position of the car navigation device 920 (such as latitude, longitude, and altitude) using GPS signals received from GPS satellites. Sensor 925 can include a set of sensors, such as a gyro sensor, a geomagnetic sensor, and an air pressure sensor. The data interface 926 is connected to, for example, the in-vehicle network 941 via a side not shown, and acquires data (such as vehicle speed data) generated by the vehicle.

The content player 927 reproduces content stored in a storage medium such as a CD and a DVD, which is inserted into the storage medium interface 928. The input device 929 includes, for example, a touch sensor, a button or a switch configured to detect a touch on the screen of the display device 930, and receives an operation or information input from a user. The display device 930 includes a screen such as an LCD or OLED display, and displays an image of the navigation function or reproduced content. The speaker 931 outputs the sound of the navigation function or the reproduced content.

The wireless communication interface 933 supports any cellular communication scheme (such as LTE and LTE-Advanced) and performs wireless communication. Wireless communication interface 933 may typically include, for example, BB processor 934 and RF circuitry 935. The BB processor 934 can perform, for example, encoding/decoding, modulation/demodulation, and multiplexing/demultiplexing, and performs various types of signal processing for wireless communication. Meanwhile, the RF circuit 935 may include, for example, a mixer, a filter, and an amplifier, and transmits and receives a wireless signal via the antenna 937. The wireless communication interface 933 can also be a chip module on which the BB processor 934 and the RF circuit 935 are integrated. As shown in FIG. 17, the wireless communication interface 933 may include a plurality of BB processors 934 and a plurality of RF circuits 935. Although FIG. 17 shows an example in which the wireless communication interface 933 includes a plurality of BB processors 934 and a plurality of RF circuits 935, the wireless communication interface 933 may also include a single BB processor 934 or a single RF circuit 935.

Further, in addition to the cellular communication scheme, the wireless communication interface 933 can support another type of wireless communication scheme, such as a short-range wireless communication scheme, a near-field communication scheme, and a wireless LAN scheme. In this case, the wireless communication interface 933 may include a BB processor 934 and an RF circuit 935 for each wireless communication scheme.

Each of the antenna switches 936 switches the connection destination of the antenna 937 between a plurality of circuits included in the wireless communication interface 933, such as circuits for different wireless communication schemes.

Each of the antennas 937 includes a single or multiple antenna elements (such as multiple antenna elements included in a MIMO antenna) and is used for the wireless communication interface 933 to transmit and receive wireless signals. As shown in FIG. 17, the car navigation device 920 can include a plurality of antennas 937. Although FIG. 17 shows an example in which the car navigation device 920 includes a plurality of antennas 937, the car navigation device 920 may also include a single antenna 937.

Additionally, car navigation device 920 can include an antenna 937 for each wireless communication scheme. In this case, the antenna switch 936 can be omitted from the configuration of the car navigation device 920.

Battery 938 provides power to various blocks of car navigation device 920 shown in FIG. 17 via feeders, which are partially shown as dashed lines in the figures. Battery 938 accumulates power supplied from the vehicle.

In the car navigation device 920 shown in FIG. 17, the processing circuit 10010, the interleaver 10020, and the spreader 10030 described by using FIG. 8 can be realized by the wireless communication interface 933. At least a portion of the functionality can also be implemented by processor 921.

The technology of the present disclosure may also be implemented as an in-vehicle system (or vehicle) 940 that includes one or more of the car navigation device 920, the in-vehicle network 941, and the vehicle module 942. The vehicle module 942 generates vehicle data such as vehicle speed, engine speed, and fault information, and outputs the generated data to the in-vehicle network 941.

7. CONCLUSION

An electronic device for a control terminal, an electronic device for a transmitting side, and an electronic device for a receiving side and communication processing performed thereby according to an embodiment of the present disclosure have been described.

Although the preferred embodiments of the present disclosure have been described in detail with reference to the accompanying drawings, the technical scope of the present disclosure is not limited thereto. It will be appreciated by those skilled in the art that various modifications, combinations, sub-combinations and substitutions may be made in accordance with the needs of the design and other factors.

In the foregoing embodiments, the example in which the communication system is a system conforming to LTE or LTE-A has been described, but the embodiment of the present disclosure is not limited thereto. For example, the communication system can be a system that conforms to another communication standard.

Furthermore, the processing steps in the communication processing in this specification are not strictly limited to being performed in chronological order in accordance with the order described in the flowcharts. For example, the processing steps in the communication processing may be performed in an order different from the order described herein as a flowchart, and further may be performed in parallel.

What is claimed is:

1. An electronic device for an Interleave Division Multiple Access (IDMA) control terminal, comprising:
   a processing circuit, configured to:
      acquire information from plural remote transmitting devices, the information from each of the plural remote transmitting devices being about IDMA communication between a respective one of the plural remote transmitting devices and a remote receiving device;
      determine configuration parameters for the remote receiving device and each of the plural remote transmitting devices based on the information, the configuration parameters comprising IDMA operation parameters so as to distinguish transmissions of each of the plural remote transmitting devices,
wherein the IDMA operation parameters comprise identification information that indicates whether a type of interleaver configured for each of the plural remote transmitting devices is a quadrature interleaver or a random interleaver; and
provide the determined configuration parameters to the remote receiving device and to each of remote transmitting devices,
wherein the plural remote transmitting devices are physically separate devices,
wherein the remote receiving device is a device that is physically separate from each of the plural remote transmitting devices, and
wherein the electronic device is physically separate from each of the plural remote transmitting devices and the remote receiving device.

2. The electronic device according to claim 1, wherein the information comprises information indicating a channel status of communication between the remote receiving device and each of remote transmitting devices.

3. The electronic device according to claim 1, wherein the information comprises data transmission requirement information about data transmission between the remote receiving device and a respective one of remote transmitting devices, the data transmission requirement information indicating one or more of a data amount or a required data transmission velocity.

4. The electronic device according to claim 3, wherein the IDMA operation parameters indicates a number of interleavers available for each of the plural remote transmitting devices.

5. The electronic device according to claim 1, wherein the identification information corresponds to an interleaver construction sequence.

6. The electronic device according to claim 2,
wherein the processing circuit is configured to give priority to an allocation of quadrature interleavers for one or more of the plural remote transmitting devices based on the channel status between which and the remote receiving device meeting a predetermined condition, and
wherein the processing circuit is configured to, based on one or more quadrature interleavers having been allocated, allocate random interleavers to any remaining remote transmitting devices.

7. The electronic device according to claim 3, wherein the configuration parameters further comprise spread code length information indicating a spread code length of a spreader of each of remote transmitting devices, and the processing circuit is configured to determine the spread code length based on the data transmission requirement information.

8. The electronic device according to claim 7, wherein the processing circuit is configured to determine spread code lengths for each of the plural remote transmitting devices separately, and take a minimum among the determined spread code lengths as a common spread code length for each of the plural remote transmitting devices.

9. The electronic device according to claim 4, wherein the IDMA operation parameters further comprise information indicating a number of interleavers to be used by each of the plural remote transmitting devices, and the processing circuit is configured to determine the number of interleavers based on the data transmission requirement information and the number of interleavers available for each of the plural remote transmitting devices.

10. The electronic device according to claim 1, wherein the processing circuit is configured to allocate a same time-frequency resource for each of the plural remote transmitting devices for the interleaved multiple access communication between the remote receiving device and the plural remote transmitting devices.

11. A method for Interleave Division Multiple Access (IDMA) control, the method performed by an IDMA control terminal having a processing circuit and comprising:
acquiring information from plural remote transmitting devices, the information from each of the plural remote transmitting devices being about IDMA communication between a respective one of the plural remote transmitting devices and a remote receiving device;
determining configuration parameters for the remote receiving device and each of the plural remote transmitting devices based on the information, the configuration parameters comprising IDMA operation parameters so as to distinguish transmissions of each of the plural remote transmitting devices,
wherein the IDMA operation parameters comprise identification information that indicates whether a type of interleaver configured for each of the plural remote transmitting devices is a quadrature interleaver or a random interleaver; and
providing the determined configuration parameters to the remote receiving device and to each of remote transmitting devices,
wherein the plural remote transmitting devices are physically separate devices,
wherein the remote receiving device is a device that is physically separate from each of the plural remote transmitting devices, and
wherein the electronic device is physically separate from each of the plural remote transmitting devices and the remote receiving device.

12. The method according to claim 11, wherein the information comprises information indicating a channel status of communication between the remote receiving device and each of remote transmitting devices.

13. The method according to claim 11, wherein the information comprises data transmission requirement information about data transmission between the remote receiving device and a respective one of remote transmitting devices, the data transmission requirement information indicating one or more of a data amount or a required data transmission velocity.

14. The method according to claim 13, wherein the IDMA operation parameters indicates a number of interleavers available for each of the plural remote transmitting devices.

15. The method according to claim 11, wherein the identification information corresponds to an interleaver construction sequence.

16. The method according to claim 12, further comprising:
giving priority to an allocation of quadrature interleavers for one or more of the plural remote transmitting devices based on the channel status between which and the remote receiving device meeting a predetermined condition,
wherein the processing circuit is configured to, based on one or more quadrature interleavers having been allocated, allocate random interleavers to any remaining remote transmitting devices.

17. The method according to claim 13, wherein the configuration parameters further comprise spread code length information indicating a spread code length of a spreader of each of remote transmitting devices, and the processing circuit is configured to determine the spread code length based on the data transmission requirement information.

18. The method according to claim 17, further comprising:
   determining spread code lengths for each of the plural remote transmitting devices separately, and taking a minimum among the determined spread code lengths as a common spread code length for each of the plural remote transmitting devices.

19. The method according to claim 14, wherein the IDMA operation parameters further comprise information indicating a number of interleavers to be used by each of the plural remote transmitting devices, and the processing circuit is configured to determine the number of interleavers based on the data transmission requirement information and the number of interleavers available for each of the plural remote transmitting devices.

20. The method according to claim 11, further comprising:
   allocating a same time-frequency resource for each of the plural remote transmitting devices for the interleaved multiple access communication between the remote receiving device and the plural remote transmitting devices.

* * * * *